(12) United States Patent
Zhao et al.

(10) Patent No.: US 12,262,401 B2
(45) Date of Patent: *Mar. 25, 2025

(54) ELECTRONIC DEVICE AND METHOD FOR WIRELESS COMMUNICATION, AND COMPUTER-READABLE STORAGE MEDIUM FOR GUARD BAND BASED ON INTERFERENCE CAUSED BY OVERLAPPING OF DIFFERENT RADIO ACCESS TECHNOLOGIES

(71) Applicant: Sony Group Corporation, Tokyo (JP)

(72) Inventors: Youping Zhao, Beijing (CN); Yu Zhao, Beijing (CN); Chen Sun, Beijing (CN); Xin Guo, Beijing (CN)

(73) Assignee: SONY GROUP CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/613,145

(22) Filed: Mar. 22, 2024

(65) Prior Publication Data

US 2024/0237048 A1 Jul. 11, 2024

Related U.S. Application Data

(63) Continuation of application No. 17/283,022, filed as application No. PCT/CN2019/111627 on Oct. 17, 2019, now Pat. No. 11,979,896.

(30) Foreign Application Priority Data

Oct. 24, 2018 (CN) .......................... 201811245497.8

(51) Int. Cl.
*H04W 72/541* (2023.01)
*H04L 5/14* (2006.01)
(Continued)

(52) U.S. Cl.
CPC ............. *H04W 72/541* (2023.01); *H04L 5/14* (2013.01); *H04W 16/14* (2013.01); *H04W 24/08* (2013.01); *H04W 24/10* (2013.01)

(58) Field of Classification Search
CPC ... H04W 72/541; H04W 16/14; H04W 24/08; H04W 24/10; H04L 5/14
See application file for complete search history.

(56) References Cited

U.S. PATENT DOCUMENTS

2013/0308481 A1* 11/2013 Kazmi .................. H04W 24/02
370/252
2018/0084430 A1 3/2018 Patel et al.
(Continued)

FOREIGN PATENT DOCUMENTS

| CN | 102474749 A | 5/2012 |
| CN | 103563409 A | 2/2014 |

(Continued)

OTHER PUBLICATIONS

International Search Report and Written Opinion mailed on Jan. 2, 2020, received for PCT Application PCT/CN2019/111627, Filed on Oct. 17, 2019, 9 pages including English Translation.

*Primary Examiner* — Deepa Belur
(74) *Attorney, Agent, or Firm* — XSENSUS LLP

(57) ABSTRACT

The present invention provides an electronic device and method for wireless communication, and a computer-readable storage medium. The electronic device comprises: a processing circuit, configured to: determine a first resource application system and a second application system which interfere with each other in management ranges of spectrum management apparatuses and respectively use different wireless access technologies; and determine, according to the interference situation between the first resource application system and the second resource application system, the width of a guard band between spectrum resources (Continued)

allocated for the first resource application system and the second resource application system.

10 Claims, 19 Drawing Sheets

(51) Int. Cl.
    *H04W 16/14*     (2009.01)
    *H04W 24/08*     (2009.01)
    *H04W 24/10*     (2009.01)

(56) References Cited

U.S. PATENT DOCUMENTS

| | | | |
|---|---|---|---|
| 2018/0124792 A1* | 5/2018 | Khoshnevisan | H04W 16/10 |
| 2018/0191482 A1* | 7/2018 | Zirwas | H04L 5/1469 |
| 2019/0089498 A1* | 3/2019 | Pelletier | H04L 5/005 |
| 2019/0207697 A1 | 7/2019 | Ghasemzadeh et al. | |
| 2019/0335336 A1* | 10/2019 | Cimpu | H04W 28/16 |
| 2020/0329406 A1* | 10/2020 | Singh | H04W 36/00835 |
| 2021/0105812 A1 | 4/2021 | Rastegardoost et al. | |
| 2021/0345352 A1* | 11/2021 | Zhao | H04W 24/08 |
| 2022/0231827 A1* | 7/2022 | Fan | H04L 5/005 |
| 2024/0251364 A1* | 7/2024 | Kim | H04B 7/1851 |

FOREIGN PATENT DOCUMENTS

| | | |
|---|---|---|
| CN | 104094653 A | 10/2014 |
| CN | 107852233 A | 3/2018 |
| CN | 108365901 A | 8/2018 |
| WO | 2016/065992 A1 | 5/2016 |
| WO | 2018/009278 A1 | 1/2018 |

\* cited by examiner

| CBSD index | 1 | 2 | 3 | 4 | 5 | 6 |
|---|---|---|---|---|---|---|
| Initial allocation | 1 | 2 | 3 | 4 | 5 | 1 |
| $w_{16} = 1$ | 1 | 2 | 3 | 4 | 5 | <u>3</u> |
| $w_{46} = 1$ | 1 | 2 | 3 | 4 | 5 | <u>6</u> |
Figure 9
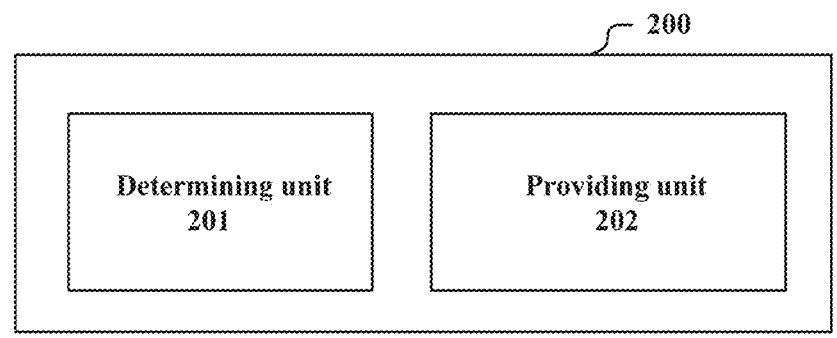
Figure 10
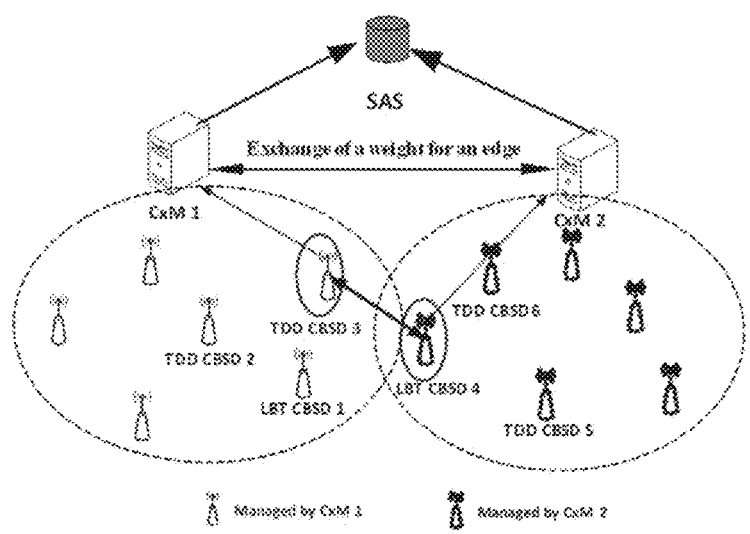
Figure 11

ELECTRONIC DEVICE AND METHOD FOR WIRELESS COMMUNICATION, AND COMPUTER-READABLE STORAGE MEDIUM FOR GUARD BAND BASED ON INTERFERENCE CAUSED BY OVERLAPPING OF DIFFERENT RADIO ACCESS TECHNOLOGIES

CROSS-REFERENCE TO RELATED APPLICATIONS

The present application is a continuation of U.S. application Ser. No. 17/283,022, filed Apr. 6, 2021, which is based on PCT filing PCT/CN2019/111627, filed Oct. 17, 2019, which claims priority to Chinese Patent Application No. 201811245497.8, titled "ELECTRONIC DEVICE AND METHOD FOR WIRELESS COMMUNICATION, AND COMPUTER-READABLE STORAGE MEDIUM", filed on Oct. 24, 2018 with the China National Intellectual Property Administration, each of which are incorporated herein by reference in its entirety.

FIELD

The present disclosure relates to the technical field of wireless communications, in particular to spectrum management technology, and in more particular to an electronic apparatus and a method for wireless communications and a computer-readable storage medium.

BACKGROUND

Wireless communication systems are widely configured to provide various telecommunication services, such as voice, video, data, and broadcasting. The wireless communication system can support multiple users to share available spectrum resources with multiple radio access technologies (RAT). For example, these radio access technologies may include multiple access technologies based on different air interfaces such as code division multiple access (CDMA), time division multiple access (TDMA), frequency division multiple access (FDMA), orthogonal frequency division multiple access (OFDMA)) and even the fifth-generation mobile communication new radio access (5G New Radio, 5G NR). On the other hand, different radio access technologies may include, for example, global system for mobile communications (GSM), long term evolution-frequency division duplex (LTE-FDD), long term evolution-time division duplex (LTE-TDD), long term evolution-listen before talk (LTE-LBT), wireless fidelity (WiFi), worldwide interoperability for microwave access (WiMax).

On the one hand, base stations or user equipment adopting different radio access technologies must meet requirements of different transmitter radiation template specifications, resulting in different out of band leakage interferences. On the other hand, receivers adopting different radio access technologies have different requirements for co-frequency/adjacent-frequency interference guard.

According to actual needs of operators and users, networks of different radio access technologies may be distributed within one region at the same time. When allocating spectrum resources in a scenario where different radio access technologies coexist, a problem of interferences among systems adopting different radio access technologies is required to be considered.

SUMMARY

In the following, an overview of the present disclosure is given simply to provide basic understanding to some aspects of the present disclosure. It should be understood that this overview is not an exhaustive overview of the present disclosure. It is not intended to determine a critical part or an important part of the present disclosure, nor to limit the scope of the present disclosure. An object of the overview is only to give some concepts in a simplified manner, which serves as a preface of a more detailed description described later.

An electronic apparatus for wireless communications is provided according to an aspect of the present disclosure. The electronic apparatus includes processing circuitry, which is configured to: determine a first resource utilization system and a second resource utilization system within a management range of a spectrum management device, which interfere with each other and adopt different radio access technologies respectively; and determine, based on interference conditions between the first resource utilization system and the second resource utilization system, a width of a guard band between spectrum resources allocated to the first resource utilization system and those allocated to the second resource utilization system.

A method for wireless communications is provided according to another aspect of the present disclosure. The method includes: determining a first resource utilization system and a second resource utilization system within a management range of a spectrum management device, which interfere with each other and adopt different radio access technologies respectively; and determining, based on interference conditions between the first resource utilization system and the second resource utilization system, a width of a guard band between spectrum resources allocated to the first resource utilization system and those allocated to the second resource utilization system.

With the electronic apparatus and the method according to the above aspects of the present disclosure, the guard band among resource utilization systems adopting different radio access technologies respectively can be set based on actual interference conditions, thereby realizing coexistence management among these resource utilization systems.

An electronic apparatus for wireless communications is provided according to an aspect of the present disclosure. The electronic apparatus includes processing circuitry, which is configured to: determine a weight for an edge in an interference overlapping map in which vertexes represent respective resource utilization systems managed by a first spectrum management device and an edge is connected between two resource utilization systems which interfere with each other, wherein the weight for the edge represents a width of a guard band to be set when the resource utilization systems corresponding to the edge adopt different radio access technologies; and provide information of the weight to a second spectrum management device.

A method for wireless communications is provided according to another aspect of the present disclosure. The method includes: determining a weight for an edge in an interference overlapping map in which vertexes represent respective resource utilization systems managed by a first spectrum management device and an edge is connected between two resource utilization systems which interfere with each other, wherein the weight for the edge represents a width of a guard band to be set when the resource utilization systems corresponding to the edge adopt different radio access technologies; and providing information of the weight to a second spectrum management device.

With the electronic apparatus and the method according to the above aspects of the present disclosure, the information of the weight for the edge in the interference overlapping map can be exchanged among different spectrum management devices, so as to coordinate and unify these spectrum management devices.

An electronic apparatus for wireless communications is provided according to an aspect of the present disclosure. The electronic apparatus includes processing circuitry, which is configured to: select a terminal device located in an overlapping region of a serving resource utilization system with another resource utilization system, wherein the serving resource utilization system and the other resource utilization system adopt different radio access technologies; and generate a measurement configuration for use by the terminal device to perform interferences measuring.

A method for wireless communications is provided according to another aspect of the present disclosure. The method includes: selecting a terminal device located in an overlapping region of a serving resource utilization system with another resource utilization system, wherein the serving resource utilization system and the other resource utilization system adopt different radio access technologies; and generating a measurement configuration for use by the terminal device to perform interferences measuring.

With the electronic apparatus and the method according to the above aspects of the present disclosure, interferences between resource utilization systems adopting different radio access technologies can be accurately measured.

An electronic apparatus for wireless communications is provided according to an aspect of the present disclosure. The electronic apparatus includes processing circuitry, which is configured to: acquire a measurement configuration from a base station, the measurement configuration being utilized for measuring interferences induced by another resource utilization system adopting a different radio access technology; and perform measuring and reporting of a measurement result according to the measurement configuration.

A method for wireless communications is provided according to another aspect of the present disclosure. The method includes: acquiring a measurement configuration from a base station, the measurement configuration being utilized for measuring interferences induced by another resource utilization system adopting a different radio access technology; and performing measuring and reporting of a measurement result according to the measurement configuration.

With the electronic apparatus and the method according to the above aspects of the present disclosure, interferences between resource utilization systems adopting different radio access technologies can be accurately measured.

According to other aspects of the present disclosure, there are further provided computer program codes and computer program products for implementing the methods for wireless communications above, and a computer readable storage medium having recorded thereon the computer program codes for implementing the methods for wireless communications described above.

These and other advantages of the present disclosure will be more apparent by illustrating in detail a preferred embodiment of the present disclosure in conjunction with accompanying drawings below.

BRIEF DESCRIPTION OF THE DRAWINGS

To further set forth the above and other advantages and features of the present disclosure, detailed description will be made in the following taken in conjunction with accompanying drawings in which identical or like reference signs designate identical or like components. The accompanying drawings, together with the detailed description below, are incorporated into and form a part of the specification. It should be noted that the accompanying drawings only illustrate, by way of example, typical embodiments of the present disclosure and should not be construed as a limitation to the scope of the disclosure. In the accompanying drawings:

FIG. 9 shows an example of adjustment based on an initial channel allocation;

FIG. 10 is a block diagram showing functional modules of an electronic apparatus for wireless communications according to another embodiment of the present disclosure;

FIGS. 11 and 12 are schematic diagrams showing examples of exchange of a weight of an edge between a first spectrum management device and a second spectrum management device in a case that both the first spectrum management device and the second spectrum management device are coexistence managers;

DETAILED DESCRIPTION OF EMBODIMENTS

Figure 1:
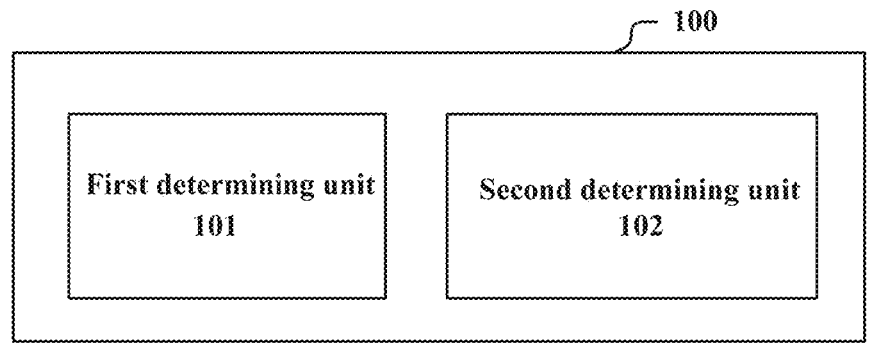
FIG. 1 is a block diagram showing functional modules of an electronic apparatus for wireless communications according to an embodiment of the present disclosure.

An exemplary embodiment of the present disclosure will be described hereinafter in conjunction with the accompanying drawings. For the purpose of conciseness and clarity, not all features of an embodiment are described in this specification. However, it should be understood that multiple decisions specific to the embodiment have to be made in a process of developing any such embodiment to realize a particular object of a developer, for example, conforming to those constraints related to a system and a service, and these constraints may change as the embodiments differs. Furthermore, it should also be understood that although the development work may be very complicated and time-consuming, for those skilled in the art benefiting from the present disclosure, such development work is only a routine task.

Here, it should also be noted that in order to avoid obscuring the present disclosure due to unnecessary details, only a device structure and/or processing steps closely related to the solution according to the present disclosure are illustrated in the accompanying drawing, and other details having little relationship to the present disclosure are omitted.

First Embodiment

In a coexistence scenario, a specific spectrum may be dynamically utilized among different wireless communication systems (same type of wireless communication systems adopting the same RAT or different types of wireless communication systems adopting different RATs), and the dynamic utilization of the spectrum is required to be managed. For example, a central management device or a spectrum management device may be provided to manage spectrum utilization of wireless communication systems in a management region of the central management device or the spectrum management device. These wireless communication systems may be referred to as resource utilization systems herein. For example, a resource utilization system may include a base station and user equipment. Taking a sharing framework of a spectrum access system (SAS) limited by citizens broadband radio service (CBRS) as an example, the resource utilization system may include functional entities citizens broadband radio service device (CBSD) and/or an end user device (EUD).

There are generally multiple resource utilization systems within a management range of a central management device or a spectrum management device. The central management device allocates available spectrum resources among these resource utilization systems reasonably to ensure efficiency and fairness of resource utilization. In the following description, reference may be made to the sharing framework of the CBRS. However, it should be understood that the technology of the present disclosure is not limited to being applied to CBRS, but may be applied to a scenario where there are multiple resource utilization systems adopting different RATs in the same geographic region or a scenario where spectrum resources are required to be allocated among these resource utilization systems.

FIG. 1 is a block diagram showing functional modules of an electronic apparatus for wireless communications according to an embodiment of the present disclosure. As shown in FIG. 1, an electronic apparatus 100 includes a first determining unit 101 and a second determining unit 102. The first determining unit 101 is configured to determine a first resource utilization system and a second resource utilization system within a management range of a spectrum management device, where the first resource utilization system and the second resource utilization system interfere with each other and adopt different radio access technologies respectively. The second determining unit 102 is configured to determine, based on interference conditions between the first resource utilization system and the second resource utilization system, a width of a guard band between spectrum resources allocated to the first resource utilization system and those allocated to the second resource utilization system.

The first determining unit 101 and the second determining unit 102 may be implemented by one or more processing circuitries. The processing circuitry may be implemented as, for example, a chip. In addition, it should be understood that various functional units in the apparatus shown in FIG. 1 are logical modules divided based on specific functions implemented by these functional units, and are not intended to limit implementations, which is also applicable to examples of other electronic apparatuses to be described subsequently.

The electronic apparatus 100 may be arranged at a side of the central management device or spectrum management device or may be communicatively connected to the central management device or spectrum management device. In addition, the electronic apparatus 100 may also be arranged at a side of a core network. The central management device or spectrum management device described herein may be implemented as various functional entities, such as the SAS or coexistence manager (CxM) in the aforementioned framework of the CBRS, or a group spectrum coordinator (GSC). In the framework of the CBRS, a part of functions of the electronic apparatus 100 may be implemented by the SAS, and another part of the functions of the electronic apparatus 100 may be implemented by the CxM, and so on. It should be understood that these are not restrictive.

It should be further pointed out that the electronic apparatus 100 may be implemented at a chip level or an apparatus level. For example, the electronic apparatus 100 may function as the central management device or spectrum management device itself and further include external apparatuses such as a memory and a transceiver (which are not shown in the drawings). The memory may be configured to store programs to be executed and related data information required for the central management device or spectrum management device to implement various functions. The transceiver may include one or more communication interfaces to support communications with various apparatuses (for example, a base station, another central management device or spectrum management device, user equipment or the like). Implementations of the transceiver are not limited herein.

As mentioned above, in the coexistence scenario, the problem of interferences between the resource utilization systems adopting different RATs, such as co-channel interferences, adjacent-channel interferences and the like, is to be considered. A solution to the problem of interferences is to insert a guard band (GB) between the spectrum resources to be adopted by two resource utilization systems. In an example of the present disclosure, an interval between respective central carrier frequencies of the two resource utilization systems is defined as a width of the guard band.

Figure 2:
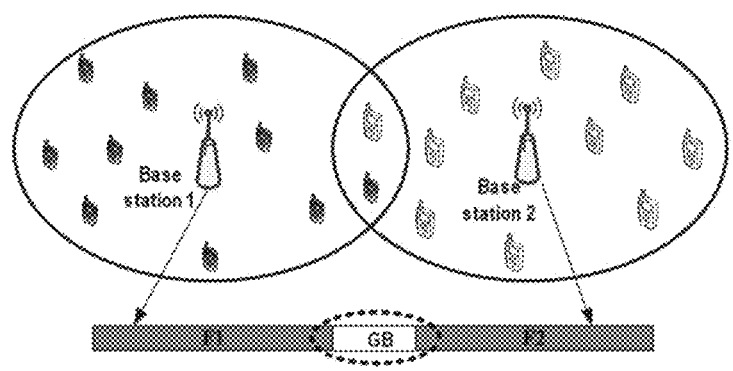
FIG. 2 shows an example of a first resource utilization system and a second resource utilization system.

In this embodiment, the first determining unit 101 determines a pair of resource utilization systems that interfere with each other and respectively adopt different RATs. The pair of resource utilization systems includes a first resource utilization system and a second resource utilization system. FIG. 2 shows an example of a first resource utilization system and a second resource utilization system. As shown in FIG. 2, a coverage range of the first resource utilization system (a base station 1 and its user equipment) and a coverage range of the second resource utilization system (a base station 2 and its user equipment) overlap with each other. Therefore, the first resource utilization system and the second resource utilization system may interfere with each other. For example, the first resource utilization system is an LTE-TDD system, and the second resource utilization system is an LTE-LBT system. It should be understood that the first and second mentioned here are only for distinguishing purposes, and do not indicate any order or other specific meanings. For example, there is a GB between spectrum resources F1 allocated to the first resource utilization system and spectrum resources F2 allocated to the second resource utilization system.

For example, the first determining unit 101 may determine the first resource utilization system and the second resource utilization system based on an interference overlapping map. The interference overlapping map is utilized to represent interference/coexistence among resource utilization systems within the management range of the spectrum management device in a form of a graph. Multiple vertexes are distributed in the interference overlapping map. Each of the multiple vertexes represents one resource utilization system. Alternatively, each of the multiple vertexes represents multiple resource utilization systems that adopt the same spectrum resources. In other words, in a case that multiple resource utilization systems can coexist, the multiple resource utilization systems are represented as a single vertex on the interference overlapping map. In a case that resource utilization systems represented by two vertexes interfere with each other, the two vertexes are linked to each other to form an edge. Therefore, the first determining unit 101 may search for two vertexes connected by an edge in the interference overlapping map, and determine the resource utilization systems represented by the two vertexes as the first resource utilization system and the second resource utilization system respectively in a case that the resource utilization systems represented by the two vertexes adopt different RATs, where the two vertexes are respectively defined as a first vertex and a second vertex.

The interference overlapping map in this example may be an interference overlapping map initially constructed by the present spectrum management device (such as the SAS or CxM). In a case that the present spectrum management device is, for example, the CxM, the interference overlapping map may be obtained from the SAS. For case of understanding, FIG. 3 shows an example of an interference overlapping map initially constructed by the spectrum management device.

Figure 3:
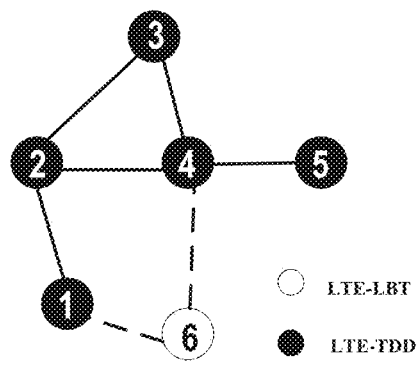
FIG. 3 shows an example of an interference overlapping map.

As shown in FIG. 3, vertexes 1 to 5 each represent an LTE-TDD system, and a vertex 6 represents an LTE-LBT system. Vertexes connected by an edge represented by a dashed line form a pair of the first resource utilization system and the second resource utilization system. For example, the first determining unit 101 may determine, based on the interference overlapping map shown in FIG. 3, the LTE-TDD system represented by the vertex 1 as the first resource utilization system, and the LTE-LBT system represented by the vertex 6 as the second resource utilization system. It should be understood that the LTE-TDD and LTE-LBT described here are only examples of RATs and are not restrictive.

Next, the second determining unit 102 determines the width of the guard band (GB) based on the interference conditions between the first resource utilization system and the second resource utilization system. For example, in order to ensure accuracy and stability of setting the guard band, the second determining unit 102 may further be configured to determine the width of the guard band in a case that the interference conditions are maintained for at least a predetermined time period. The predetermined time period may be achieved by setting a time lag threshold. The second determining unit 102 determines the width of the guard band only in a case that duration of the interferences exceeds the time lag threshold.

In an example, the second determining unit 102 may determine the width of the guard band based on a measurement result of interference measuring performed by a terminal device located in an overlapping region of the first resource utilization system and the second resource utilization system. Taking FIG. 3 as an example, a terminal device in the overlapping region is located in an overlapping region of an ellipse representing the coverage range of the base station 1 and an ellipse representing the coverage range of the base station 2.

Figure 4:
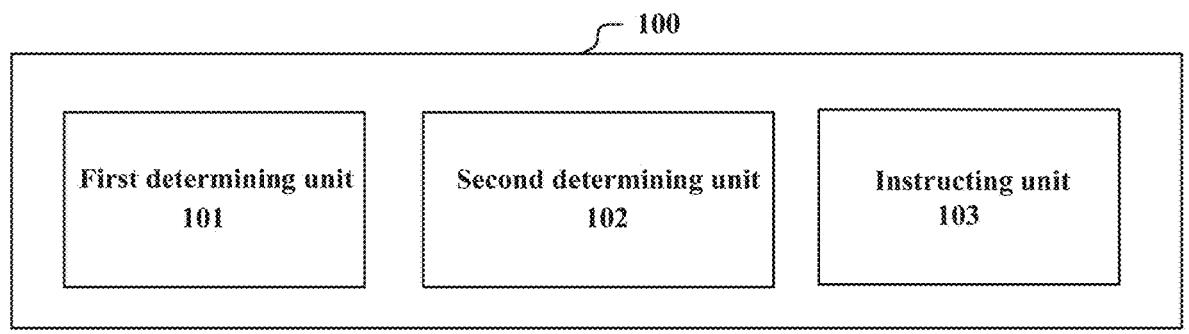
FIG. 4 is a block diagram showing functional modules of an electronic apparatus for wireless communications according to an embodiment of the present disclosure.

Correspondingly, as shown in FIG. 4, the electronic apparatus 100 may further include an instructing unit 103, which is configured to instruct one of the first resource utilization system and the second resource utilization system to perform measurement configuration on its one or more terminal devices located in the overlapping region. For example, the instructing may be periodic or executed in response to a specific trigger condition, such as a condition that communication quality of some resource utilization systems fall to a predetermined level, or the like.

The instructing unit 103 is optional. The measurement configuration on the terminal device may be performed by the base station of the resource utilization system by itself.

The instructing unit 103 may provide one or more of the following to the base station of one of the first resource utilization system and the second resource utilization system for measurement configuration: a measurement frequency list, measurement time, measurement duration, a physical quantity to be measured, a measurement result reporting format, a reporting rule, a co-channel interferences-to-noise ratio threshold, and an adjacent channel interferences-to-noise ratio threshold. The measurement frequency list indicates frequency points to be measured, the measurement time indicates the timing of performing the measurement, and the measurement duration indicates a length of the time period the measurement lasts. The physical quantity to be measured indicates a physical parameter measured in order to obtain the interference conditions. For example, the physical quantity to be measured includes one or more of the following: a received signal strength indicator (RSSI), reference signal received power (RSRP), reference signal received quality (RSRQ), a time domain sampling signal and the like. The measurement result reporting format indicates an item and a specific data format and the like of the measurement result to be reported. The reporting rule indicates a condition for reporting the measurement result. For example, the reporting rule includes one or more of the following: periodic reporting, reporting when a predetermined condition is met, and so on. The co-channel interferences-to-noise ratio threshold and the adjacent-channel interferences-to-noise ratio threshold may be utilized to make determination at a side of the terminal device to reduce the signaling overhead for reporting the measurement result.

For example, the measurement result may include one or more of the following: co-channel interferences, adjacent channel interferences, a co-channel interferences-to-noise ratio, an adjacent channel interferences-to-noise ratio, an out of band emission (OOBE) model of the first resource utilization system and/or the second resource utilization system.

The terminal device may extract the co-channel interferences and the adjacent channel interferences according to an obtained measured value of the physical parameter, or further calculate the co-channel interferences-to-noise ratio and the adjacent channel interferences-to-noise ratio. In addition, the terminal device may perform Fast Fourier transform (FFT) on the sampling points of a received time-domain signal to obtain the OOBE. A specific example of the measurement performed by the terminal device will be given later.

Based on the obtained measurement result of interference, the second determining unit 102 may determine the width of the guard band so that the interferences the first resource utilization system is subjected to from the second resource utilization system are kept within a predetermined range. In a case that a measurement result of the interferences between the first resource utilization system and the second resource utilization system is within the predetermined range, the second determining unit 102 may set the width of the guard band to 0. That is, no guard band is set.

For example, the terminal device is served by the first resource utilization system. The measurement result includes the co-channel interferences-to-noise ratio, the adjacent-channel interferences-to-noise ratio of the terminal device, and the out of band emission model of the second resource utilization system. The second determining unit 102 is configured to: calculate a difference between the co-channel interferences-to-noise ratio and a co-channel interferences-to-noise ratio threshold and a difference between the adjacent-channel interferences-to-noise ratio and an adjacent-channel interferences-to-noise ratio threshold as an interference margin; and determine the width of the guard band based on the interference margin and the above-mentioned out of band emission model.

For example, the co-channel interferences-to-noise ratio is represented by $\gamma_m^{cci}$, the co-channel interferences-to-noise ratio threshold is represented by $\gamma_{th}^{cci}$, the first adjacent channel interferences-to-noise ratio is represented by $\gamma_1^{aci}$, the first adjacent channel interferences-to-noise ratio threshold is represented by $\gamma_{th1}^{aci}$, the second adjacent channel interferences-to-noise ratio is represented by $\gamma_2^{aci}$, and the second adjacent channel interferences-to-noise ratio threshold is represented by $\gamma_{th2}^{aci}$. The interference margin may be calculated as follows:

$$\Delta\gamma = \max\{\gamma_m^{cci} - \gamma_{th}^{cci}, \gamma_1^{aci} - \gamma_{th1}^{aci}, \gamma_2^{aci} - \gamma_{th2}^{aci}\} \tag{1}$$

That is, the interference margin represents a maximum value of co-channel interferences and adjacent channel interferences beyond the interferences guard requirements, and reflects a degree of coexistence interferences under the current channel allocation. It can be understood that a greater interference margin indicates stronger coexistence interferences between the first resource utilization system and the second resource utilization system, and a wider guard band required therebetween. The adjacent channel interferences-to-noise threshold (for example, $\gamma_{th1}^{aci}$ and $\gamma_{th2}^{aci}$) may be set based on requirements for adjacent channel interferences in the 3GPP standard, based on restrictions on out of band leakage interferences by CBRS Alliance, or based on other standards.

In addition, the setting of the width of the guard band is further affected by the OOBE model of an interference source. In the above example, the second resource utilization system exists as an interference source, and its OOBE model is represented by $\Omega$. The second determining unit 102 may determine a width GB of the guard band from the following equation (2):

$$GB = \Omega(\Delta\gamma) \tag{2}$$

Figure 5:
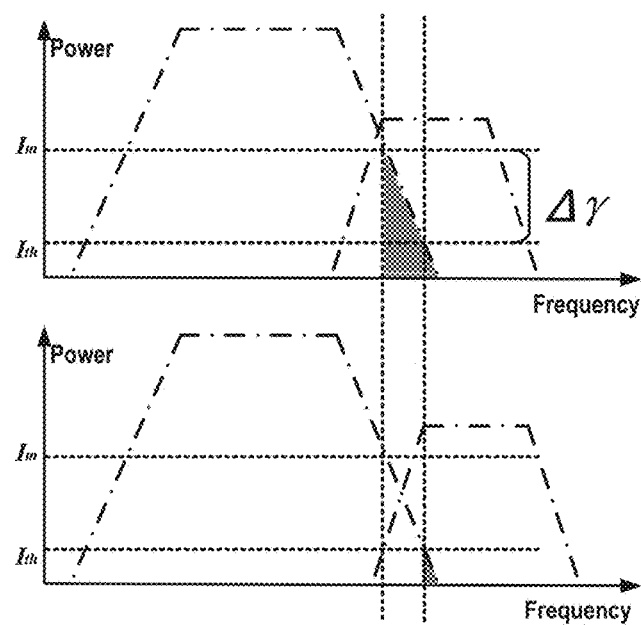
FIG. 5 is a schematic diagram showing adjustment of a guard band.

FIG. 5 is a schematic diagram showing adjustment of a guard band. Two trapezoids formed by dot-dash lines in an upper part in FIG. 5 represent OOBEs of the second resource utilization system and the first resource utilization system respectively. Two trapezoids formed by dot-dash lines in a lower part in FIG. 5 also represent OOBE models of the second resource utilization system and the first resource utilization system respectively. In the upper part, the interference margin of the second resource utilization system to the first resource utilization system in a current state reaches $\Delta\gamma$. In the lower part, the width of the guard band is increased according to the interference margin and the OOBE model of the second resource utilization system, so that the interference margin becomes zero.

In the case of utilizing the interference overlapping map, the second determining unit 102 may be further configured to set a weight for an edge between the first vertex and the second vertex in the interference overlapping map based on the width of the guard band. A value of the weight indicates a size of the width of the guard band to be set.

In an example, a size of the guard band is an integer multiple of a fixed bandwidth, and the weight is a multiple of the guard band relative to the fixed bandwidth. In particular, in a case that the guard band cannot be divisible by the fixed bandwidth, a quotient may be rounded up to obtain the multiple. The fixed bandwidth is, for example, the bandwidth of each channel, and the weight calculated herein is an interval between numbers of the channels to be utilized by the two resource utilization systems. For example, according to the relevant standards of the CBRS Alliance, the guard band may be set to an integer multiple of 5 MHz, as shown in the following equation (3).

$$GB = k * 5 (k = 0, 1, \ldots, 2K) \quad (3)$$

In the equation (3), k is the above weight. Still taking FIG. 3 as an example, it is assumed that the guard band between a vertex 1 and a vertex 6 calculated according to equation (2) is 5 MHz, the weight for the edge between the vertex 1 and the vertex 6 is equal to 1.

In some cases, two vertexes of one edge (corresponding to resource utilization systems adopting different RATs) may be managed by different spectrum management devices. For example, in the CBRS framework, CBSDs corresponding to two vertexes connected with the edge may be managed by two or more CxMs. In this case, two or more spectrum management devices may set different weights for this edge. In order to maintain consistency of the weight, interaction and coordination between different spectrum management devices is required. For example, the second determining unit 102 is further configured to acquire a second weight set by another spectrum management device for the edge between the first vertex and the second vertex, and set the weight for the edge based on the width of the guard band determined above and the second weight. It should be understood that the second weight described here may be one weight or multiple weights.

For example, the second determining unit 102 may calculate the first weight based on the width of the guard band determined above, and select a larger one of the first weight and the second weight as a final set weight, or determine an average of the first weight and the second weight as a final set weight.

Figure 6:
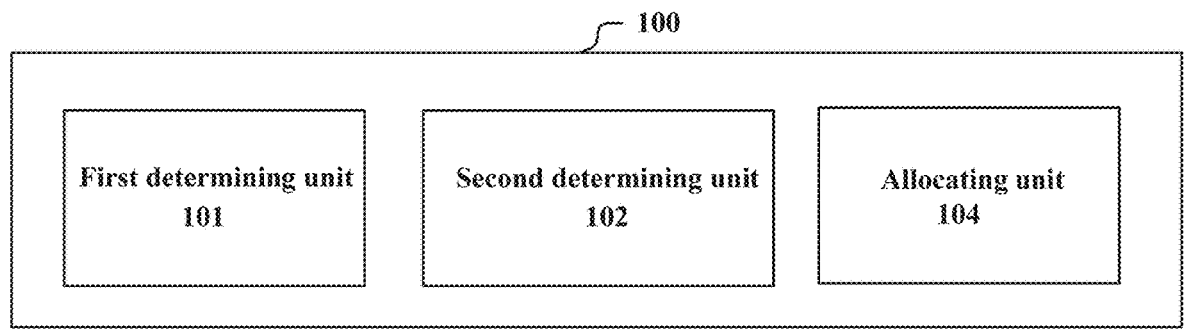
FIG. 6 is a block diagram showing functional modules of an electronic apparatus for wireless communications according to an embodiment of the present disclosure.

FIG. 6 is a block diagram showing functional modules of an electronic apparatus 100 according to another embodiment of the present disclosure. Compared with the electronic apparatus in FIG. 1, the electronic apparatus 100 shown in FIG. 6 further includes an allocating unit 104, which is configured to allocate spectrum resources based on the interference overlapping map. In a case that the second determining unit 102 determines the weight for the related edge as described above, the allocating unit 104 is further configured to update the interference overlapping map using the weight, and allocate spectrum resources based on the updated interference overlapping map.

Since not only the interferences between vertexes but also setting of the guard band between vertexes are considered in the resource allocation, a more appropriate and efficient resource allocation result can be obtained, thereby utilizing the spectrum resources more effectively. In addition, although not shown in FIG. 6, the electronic apparatus 100 may further include the instructing unit 103 shown in FIG. 4.

For example, the allocating unit 104 may first allocate spectrum resources to a resource utilization system corresponding to an edge with a high weight in the interference overlapping map. In this way, the total amount of required spectrum resources can be reduced, and resource utilization efficiency can be improved.

Figure 7:
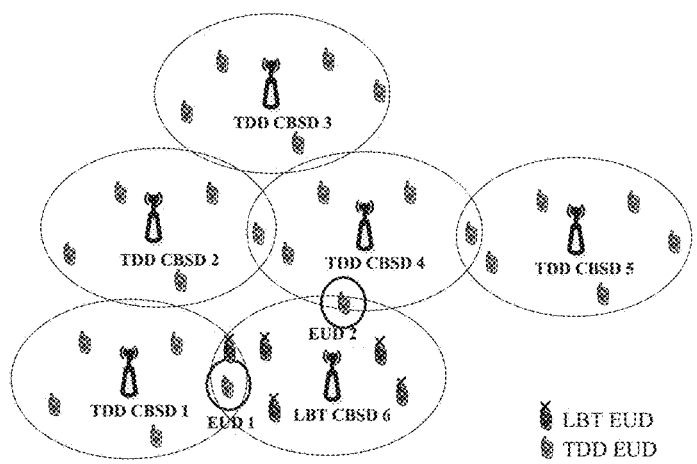
FIG. 7 is a schematic diagram of a scenario where an LTE-TDD system and an LTE-LBT system coexist.

To facilitate understanding, an application example is given below. In this application example, a scenario where an LTE-TDD system (for example, the first resource utilization system) and an LTE-LBT system (for example, the second resource utilization system) coexist is shown, as shown in FIG. 7. The LTE-TDD system includes a TDD CBSD and a EUD. The LTE-LBT system includes an LBT CBSD and a EUD. CBSD1 to CBSD5 are TDD CBSDs, and CBSD6 is an LTE CBSD. An initial interference overlapping map is shown in FIG. 3 above.

First, the first determining unit 101 finds according to the initial interference overlapping map that: the CBSD1 and the CBSD6 are connected to each other with an edge and adopt different RATs; and the CBSD4 and the CBSD6 are connected to each other with an edge and adopt different RATs. Therefore, the second determining unit 102 would determine the weights for these two edges.

The EUD1 in an overlapping region of the CBSD1 and the CBSD6, and the EUD2 in an overlapping region of CBSD4 and CBSD6 would be selected as terminal devices for measurement. This selection may be performed by the CBSD. In this example, the EUD of the LTE-TDD system may be preferentially selected to perform the measurement.

Next, the EUD1 and the EUD2 perform interference measuring according to the measurement configuration obtained from the CBSD or from the spectrum management device CxM or SAS, and report the measurement result to the CBSD and then to the spectrum management device. The measurement result includes, for example, a co-channel interferences-to-noise ratio, an adjacent channel interferences-to-noise ratio, an OOBE, or the like.

Figure 8:
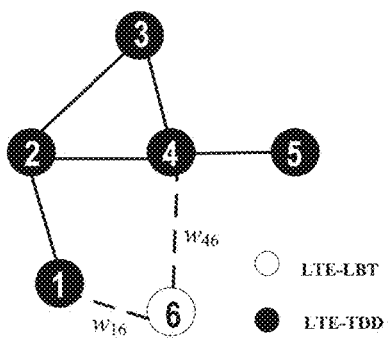
FIG. 8 shows an example of an updated interference overlapping map.

The second determining unit 102 of the spectrum management device calculates an interference margin $\Delta_{\gamma 1}$ and $\Delta_{\gamma 2}$ corresponding to the two pairs of CBSDs respectively based on the obtained measurement results, and calculates respective widths of guard bands based on the interference margin and the OOBE. For example, the guard band between the CBSD1 and the CBSD6 is calculated as $GB_{16}$=5 MHz, and the corresponding weight is calculated as $w_{16}$=1. The guard band between CBSD4 and CBSD6 is calculated as $GB_{46}$=5 MHz, and the corresponding weight is calculated as $w_{46}$=1. The interference overlapping map in FIG. 3 is updated based on the weights, and the updated interference overlapping map as shown in FIG. 8 is obtained.

The allocation unit 103 allocates the spectrum resources based on the updated interference overlapping map.

In the case of sufficient spectrum resources, for example, there being 10 channels available for allocation, FIG. 9 shows an example of adjustment based on initial channel allocation. The first row shows serial numbers 1 to 6 of the CBSDs, and the second row shows a number of a channel allocated by the initial channel allocation to each CBSD. The third row shows that the channel of CBSD6 is adjusted to channel 3 with the weight $w_{16}$ considered. However, an interval of at least one channel is required between the CBSD4 and the CBSD6 because of $w_{46}=1$, and the channel 3 is adjacent to a channel 4 allocated to the CBSD4, which cannot meet this requirement. Therefore, in the fourth row, the channel of CBSD6 is adjusted to channel 6.

In the case of insufficient spectrum resources, the limitation of the total number of available channels should also be considered in the channel allocation. For example, in a case that the coloring method is utilized for spectrum allocation, the vertexes connected by the edges with high weights are required to be colored first. Specifically, referring to FIG. 8, a vertex 6 may be colored green first, that is, a channel ch1 is allocated. Since both $w_{16}$ and $w_{46}$ are 1, vertexes 1 and 4 are colored red, that is, a channel ch3 is allocated. Next, a vertex 2 is colored green, that is, the channel ch1 is allocated. Vertexes 3 and 5 are colored yellow, that is, a channel ch2 is allocated. Therefore, three channels are required in total. On the contrary, if coloring is performed in a random order, such as the vertex 3 is colored first, at least 4 channels are required.

In summary, the electronic apparatus 100 according to this embodiment can determine, based on the interferences between two resource utilization systems adopting different RATs, the width of the guard band between the allocated spectrum resources therefor, thereby ensuring communication quality of each resource utilization system and the utilization efficiency of resources in the coexistence scenario.

Second Embodiment

FIG. 10 is a block diagram showing functional modules of an electronic apparatus 200 for wireless communications according to another embodiment of the present disclosure. As shown in FIG. 10, the electronic apparatus 200 includes a determining unit 201 and a providing unit 202. The determining unit 201 is configured to determine a weight of an edge in an interference overlapping map where vertexes represent respective resource utilization systems managed by a first spectrum management device and an edge is connected between two resource utilization systems which interfere with each other, where the weight for the edge represents a width of a guard band to be set when the resource utilization systems corresponding to the edge adopt different radio access technologies. The providing unit 202 is configured to provide information of the weight to the second spectrum management device.

Similarly, the determining unit 201 and the providing unit 202 may be implemented by one or more processing circuitries. The processing circuitry may be implemented as, for example, a chip. The electronic apparatus 200 may be arranged at a side of the central management device or spectrum management device or may be communicatively connected to the central management device or spectrum management device. In addition, the electronic apparatus 200 may also be arranged at a side of a core network.

It should be further pointed out that the electronic apparatus 200 may be implemented at a chip level or an apparatus level. For example, the electronic apparatus 200 may function as the central management device or spectrum management device itself and further include external apparatuses such as a memory and a transceiver (which are not shown in the drawings). The memory may be configured to store programs to be executed and related data information required for the central management device or spectrum management device to implement various functions. The transceiver may include one or more communication interfaces to support communications with various apparatuses (for example, a base station, another central management device or spectrum management device, user equipment or the like). Implementations of the transceiver are not limited herein.

For example, the determining unit 201 may determine the weight for the edge with the method described in the first embodiment. However, this is not restrictive, and the determining unit 201 may determine the above-mentioned weight representing the width of the guard band with other appropriate methods.

In an example, the first spectrum management device and the second spectrum management device are both CxMs. Alternatively, the first spectrum management device and the second spectrum management device are both SASs or GSCs. In other words, in the CBRS framework, the first spectrum management device and the second spectrum management device are spectrum management devices of the same level.

Figure 12:
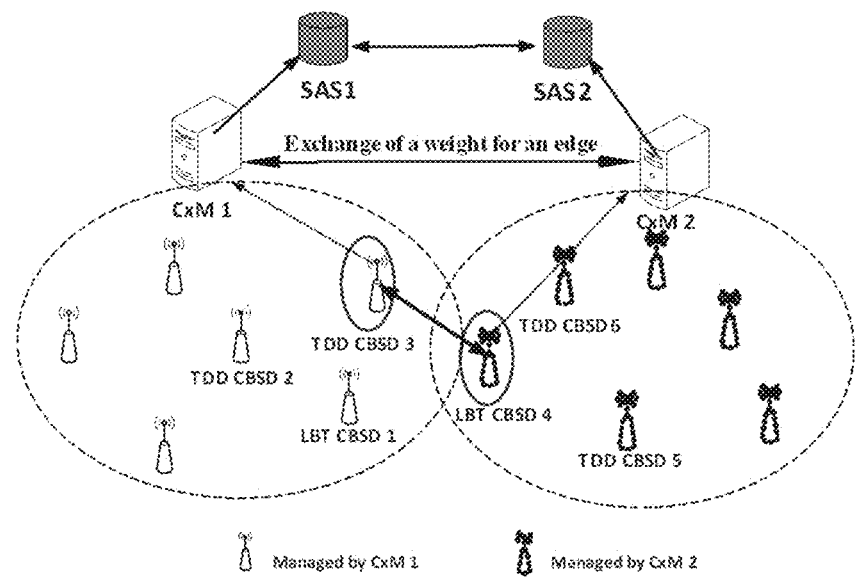

The providing unit 202 is further configured to obtain information of the weight for the edge determined by the second spectrum management device from the second spectrum management device. That is, the information of the weight is exchanged between the first spectrum management device and the second spectrum management device. FIGS. 11 and 12 are schematic diagrams showing examples of exchange of a weight of an edge between a first spectrum management device and a second spectrum management device in a case that both the first spectrum management device and the second spectrum management device are CxMs. In the example shown in FIG. 11, a first spectrum management device CxM1 and a second spectrum management device CxM2 belong to the same SAS, and the CxM1 and the CxM2 may exchange information of a weight of an edge between a CBSD3 and a CBSD4 commonly managed by the CxM1 and the CxM2.

In the example shown in FIG. 12, the CxM1 and the CxM2 belong to an SAS1 and an SAS2, respectively, and the CxM1 and the CxM2 may similarly exchange information of a weight for an edge between a CBSD3 and a CBSD4 commonly managed by the CxM1 and the CxM2.

In addition, in the examples shown in FIGS. 11 and 12, the SAS does not consider information of a weight of an edge when allocating spectrum, so that CxMs may not report information of a weight of an edge to their respective SASs.

Figure 13:
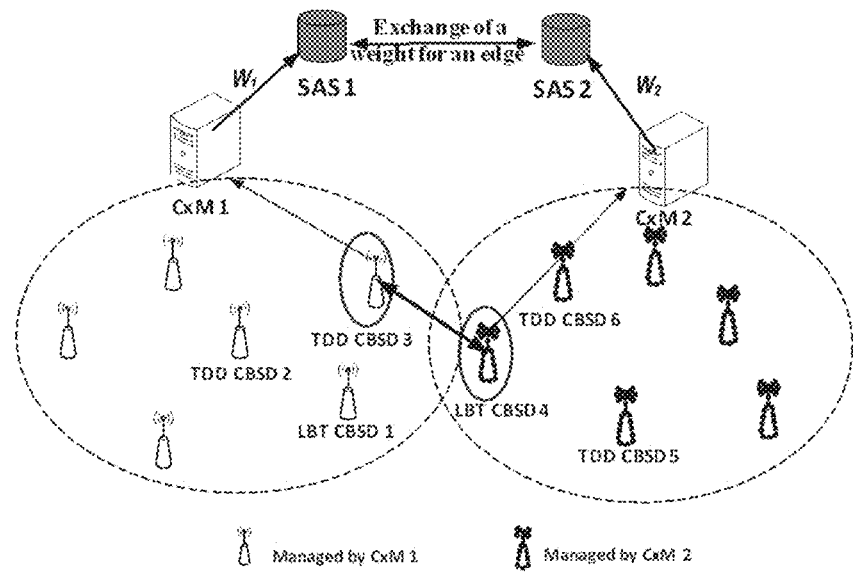
FIG. 13 shows a schematic diagram of an example of exchange of a weight of an edge between a first spectrum management device and a second spectrum management device in a case that both the first spectrum management device and the second spectrum management device are spectrum access systems.

FIG. 13 shows a schematic diagram of an example of exchange of a weight of an edge between a first spectrum management device and a second spectrum management device in a case that both the first spectrum management device and the second spectrum management device are SASs. In the example shown in FIG. 13, the CxM calculates the weight for the edge and reports the calculation result to its SAS. That is, the determining unit 201 determines the weight for the edge based on the reported information. The weight for the edge is exchanged between different SASs. These SAS can consider information of the weight for the edge when allocating spectrum. In addition, although FIG. 13 shows the calculation of the weight for the edge performed by the CxM, the calculation may also be performed by the SAS according to the interference conditions between the corresponding resource utilization systems, which is also not restrictive. The example in FIG. 13 is also applicable to the case where the SAS is replaced with a GSC.

After the information of the weight for the edge is exchanged, in a case that the weight determined by the first spectrum management device is inconsistent with the weight obtained from the second spectrum management device with respect to the same edge, the determining unit 201 may set the weight for the edge based on the two weights. For example, the determining unit 201 may calculate an average of the two weights or select a maximum of the two weights as the weight for the edge finally. In this way, weight setting for the same edge in each spectrum management device can be maintained to be consistent.

In another example, the first spectrum management device is a CxM, and the second spectrum management device is an SAS or GSC. In other words, in the CBRS framework, the first spectrum management device and the second spectrum management device are spectrum management devices of different levels.

Figure 14:
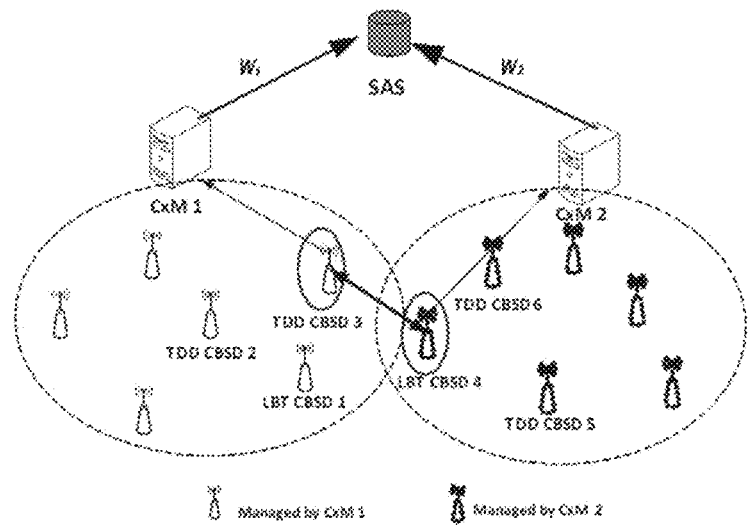
FIG. 14 shows a schematic diagram of reporting of information of a weight of an edge in a case that a first spectrum management device is a coexistence manager and a second spectrum management device is a spectrum access system.

FIG. 14 shows a schematic diagram of reporting of information of a weight of an edge in a case that a first spectrum management device is a coexistence manager and a second spectrum management device is a spectrum access system. In FIG. 14, the CxM1 and the CxM2 respectively report the calculated weights $W_1$ and $W_2$ of the edge to the SAS. For example, SAS may unify, for the same edge, the weight for the edge when the weights of the edge obtained by different CxMs are inconsistent. Correspondingly, in the case where the weight for the edge is adjusted by the second spectrum management device, the providing unit 202 may also obtain the information of the adjustment from the second spectrum management device. In this example, the SAS may consider the information of the weight for the edge when allocating spectrum.

On the other hand, the first spectrum management device may be an SAS or GSC, and the second spectrum management device may be at least one CxM. In this case, the determining unit 201 may calculate the weight for the edge based on the interference conditions between the corresponding resource utilization systems. That is, the SAS or GSC calculates the weight for the edge and provides the weight for the edge to the CxM.

Alternatively, the determining unit 201 may be configured to determine the weight for the edge in the interference overlapping map based on the information from at least one CxM about the weight for the edge in its respective interference overlapping map, and provide information of the related adjustment to the at least one CxM.

In summary, the electronic apparatus 200 according to this embodiment can determine and provide the width of the guard band between resource utilization systems adopting different RATs, to facilitate efficient utilization of spectrum resources.

Third Embodiment

Figure 15:
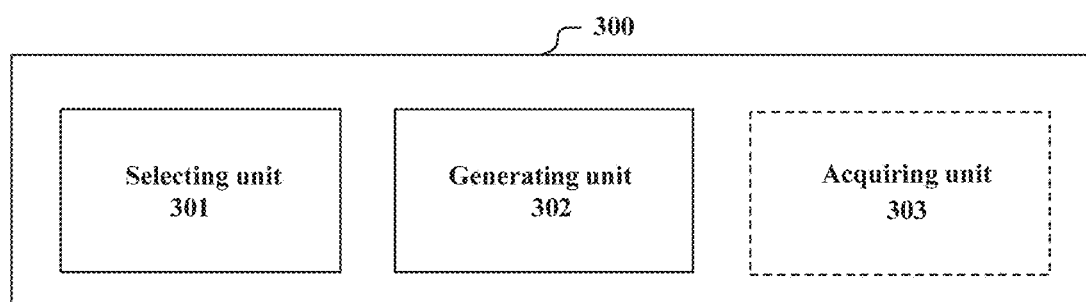
FIG. 15 is a block diagram showing functional modules of an electronic apparatus for wireless communications according to another embodiment of the present disclosure.

FIG. 15 is a block diagram showing functional modules of an electronic apparatus for wireless communications according to another embodiment of the present disclosure. As shown in FIG. 15, the electronic apparatus 300 includes a selecting unit 301 and a generating unit 302. The selecting unit 301 is configured to select a terminal device located in an overlapping region of a serving resource utilization system and another resource utilization system, where the serving resource utilization system and the other resource utilization system adopt different RATs. The generating unit 302 is configured to generate a measurement configuration for use by the terminal device to perform interference measuring.

The selecting unit 301 and the generating unit 302 may be implemented by one or more processing circuitries. The processing circuitry may be implemented as, for example, a chip and a processor. In addition, it should be understood that various functional units in the apparatus shown in FIG. 15 are logical modules divided based on functions implemented by these functional units, and are not intended to limit implementations.

The electronic apparatus 300 may, for example, be set at a side of a base station of the resource utilization system or be communicably connected to the base station (for example, a CBSD). Here, it should also be pointed out that the electronic apparatus 300 may be implemented at a chip level or an apparatus level. For example, the electronic apparatus 300 may function as a base station itself, and may also include external apparatuses such as a memory, a transceiver (not shown), and the like. The memory may be configured to store programs to be executed and related data information required for the base station to implement various functions. The transceiver may include one or more communication interfaces to support communications with various apparatuses (for example, user equipment, other base station or the like). Implementations of the transceiver are not limited herein.

The operation of the selecting unit 301 may be performed based on a trigger or may be performed periodically. For example, when being required to know the interference conditions between resource utilization systems adopting different RATs, the spectrum management device may send a corresponding instruction to the base station of the resource utilization system, and the selecting unit 301 may perform measurement in response to the instruction. Alternatively, when the communication quality of the service resource utilization system deteriorates, the selecting unit 301 may be triggered to operate. Alternatively, the operation of the selecting unit 301 may be performed according to a predetermined period, and the predetermined period may be set by a spectrum management device, for example.

The selecting unit 301 may, for example, select the terminal device located in the overlapping region according to a cell identifier reported by the terminal device, a geographic location of the terminal device, and the like. The terminal device may be, for example, various user equipments in the resource utilization system.

Subsequently, the generating unit 302 generates a measurement configuration for the selected terminal device to perform interference measuring. The measurement configuration may be acquired from a spectrum management device or may be generated by the base station by itself, so as to provide various parameters and settings for the terminal device to perform interference measuring (and reporting of a measurement result).

For example, the measurement configuration may include one or more of the following: a measurement frequency list, measurement time, measurement duration, a physical quantity to be measured, a measurement result reporting format, a reporting rule, a co-channel interferences-to-noise ratio threshold, an adjacent channel interferences-to-noise ratio threshold. Specific meanings of each item have been given in the first embodiment, and are not repeated here.

In an example, the service resource utilization system is the LTE-TDD system, and the other resource utilization system is the LTE-LBT system. The measurement time is, for example, respectively located in an uplink time slot of a TDD frame, a downlink time slot of a TDD frame, and a guard period of a special subframe of the TDD frame.

As shown in a dashed line block in FIG. 15, the electronic apparatus 300 may further include an acquiring unit 303 configured to obtain a measurement result from the terminal device and provide the measurement result to the spectrum management device.

Depending on the measurement configuration, the measurement result may have different items and data formats. For example, the measurement result may include unprocessed data measured by the terminal device, such as data of physical quantities measured during the measurement time. The measurement result may also be data after the terminal device processes the original measurement data, such as co-channel interferences, adjacent channel interferences, or a co-channel interferences-to-noise ratio, and an adjacent channel interferences-to-noise ratio extracted from the measured data of physical quantities. In addition, the measurement result may further include parameters of the OOBE obtained by the terminal device by performing FFT on a time-domain sampling signal.

In addition, the acquiring unit 303 may provide the measurement result obtained from the terminal device to the spectrum management device as it is, or may further process the measurement result and provide the further processed measurement result to the spectrum management device. For example, in a case that the co-channel interferences-to-noise ratio threshold and the adjacent-channel interferences-to-noise ratio threshold are known, the interference margin may be calculated as shown in equation (1) and may be provided to the spectrum management device.

In summary, the electronic apparatus 300 according to this embodiment can select the terminal device in the overlapping region of the resource utilization system adopting different RATs to measure the interference conditions between the resource utilization systems, so as to provide a basis for the setting of a guard band.

Fourth Embodiment

Figure 16:
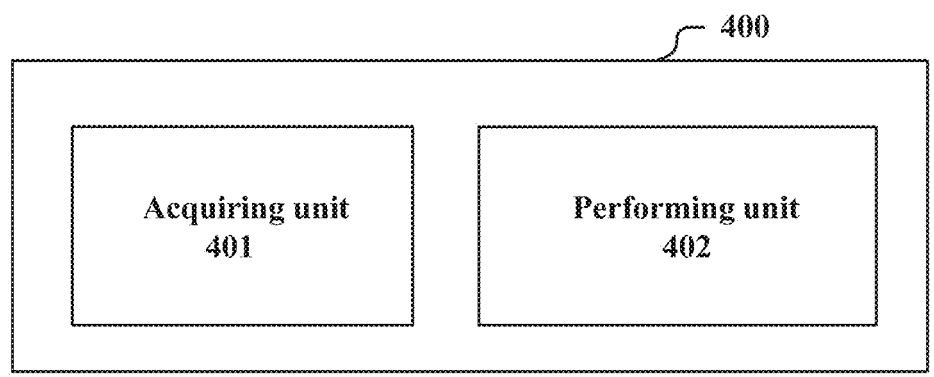
FIG. 16 is a block diagram showing functional modules of an electronic apparatus for wireless communications according to another embodiment of the present disclosure.

FIG. 16 is a block diagram showing functional modules of an electronic apparatus for wireless communications according to another embodiment of the present disclosure. As shown in FIG. 16, the electronic apparatus 400 includes an acquiring unit 401 and a performing unit 402. The acquiring unit 401 is configured to acquire a measurement configuration from a base station, the measurement configuration being utilized for measuring interferences induced by another resource utilization system adopting a different radio access technology. The performing unit 402 is configured to perform measuring and reporting of a measurement result according to the measurement configuration.

The acquiring unit 401 and the performing unit 402 may be implemented by one or more processing circuitries. The processing circuitry may be implemented as, for example, a chip and a processor. In addition, it should be understood that various functional units in the apparatus shown in FIG. 16 are logical modules divided based on functions implemented by these functional units, and are not intended to limit implementations.

The electronic apparatus 400 may, for example, be set at a side of user equipment (UE) or may be communicatively connected to the UE (for example, a EUD). Here, it should also be pointed out that the electronic apparatus 400 may be implemented at a chip level or an apparatus level. For example, the electronic apparatus 400 may function as user equipment itself, and may also include external apparatuses such as a memory, a transceiver (not shown), and the like. The memory may be configured to store programs to be executed and related data information required for the user equipment to implement various functions. The transceiver may include one or more communication interfaces to support communications with various apparatuses (for example, base station, other user equipment or the like). Implementations of the transceiver are not limited herein.

Similarly, the measurement configuration may include one or more of the following: a measurement frequency list, measurement time, measurement duration, a physical quantity to be measured, a measurement result reporting format, a reporting rule, a co-channel interferences-to-noise ratio threshold, an adjacent channel interferences-to-noise ratio threshold. Specific meanings of each item have been given in the first embodiment, and are not repeated here. The measurement configuration may be provided to the UE when the base station selects the UE corresponding to the electronic apparatus 400 for measurement. The performing unit 402 performs measuring according to the measurement configuration.

In an example, the resource utilization system corresponding to the electronic apparatus 400 is the LTE-TDD system, and the other resource utilization system is the LTE-LBT system. The measurement time is, for example, respectively located in an uplink time slot of a TDD frame, a downlink time slot of a TDD frame, and a guard period of a special subframe of the TDD frame.

Figure 17A:
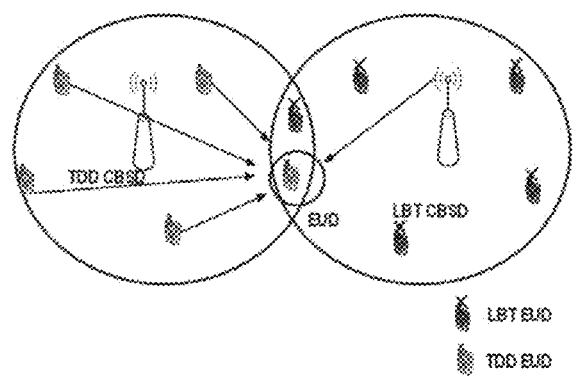
FIGS. 17A to 17F respectively show schematic diagrams of measurement scenarios in different states.
Figure 17B:
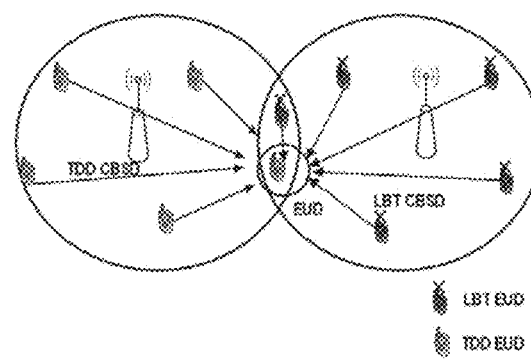
Figure 17C:
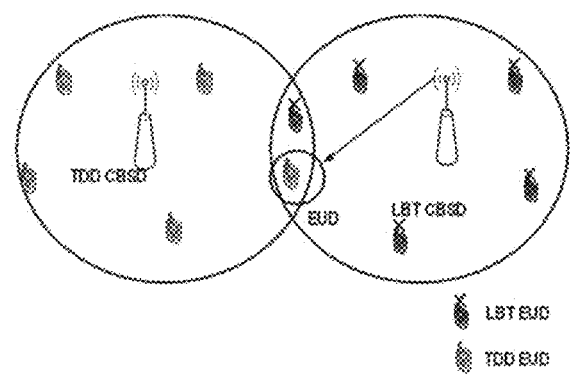
Figure 17D:
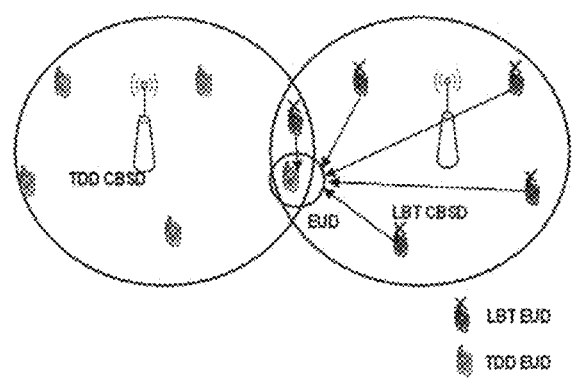
Figure 17E:
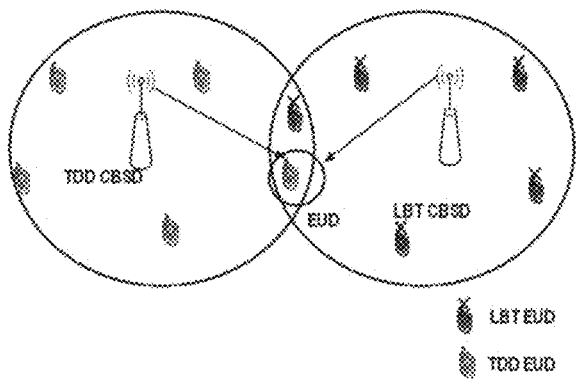
Figure 17F:
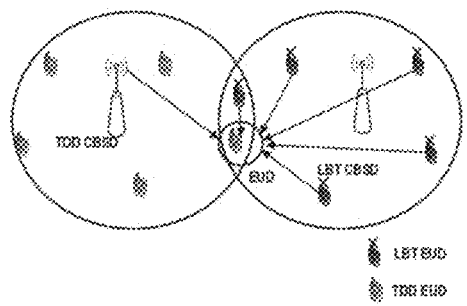

An essential difference between the LTE-TDD system and the LTE-LBT system lies in a difference in frame structure. TDD adopts a second (Type 2) frame structure for LTE, while LBT transmission adopts a third (Type 3) frame structure for LTE. The difference in frame structure causes the LTE-TDD system and the LTE-LBT system to have different wireless characteristics. When the TDD system performs transmission, uplink and downlink configuration has a periodicity, for example, 5 ms or 10 ms is a transmission cycle. When the LBT system performs transmission, downlink transmission may start at any position in a subframe and end at the end of the subframe or at a downlink pilot timeslot (DwPTS), and the uplink transmission situation is similar. Therefore, when the measurement is performed at the above-mentioned measurement time, there are various situations for the state of the LTE-LBT transmission. FIGS. 17A to 17F respectively show schematic diagrams of measurement scenarios in different states. A line with an arrow represents a source of interferences suffered by the EUD performing the measuring. In the scenario in FIG. 17A, the TDD is in an uplink time slot and the LBT performs downlink transmission. In the scenario in FIG. 17B, the TDD is in an uplink time slot and the LBT performs uplink transmission. In the scenario in FIG. 17C, the TDD is in a guard period and the LBT performs downlink transmission. In the scenario in FIG. 17D, the TDD is in the guard period and the LBT performs uplink transmission. In the scenario of FIG. 17E, the TDD is in a downlink time slot and the LBT performs downlink transmission. In the scenario in FIG. 17F, the TDD is in a downlink time slot and the LBT performs uplink transmission.

For example, the physical quantity to be measured may be a RSSI, and the performing unit 402 may extract co-channel interferences $I^{cci}$, first adjacent channel interferences $I_1^{aci}$ and second adjacent channel interferences $I_2^{aci}$ based on the RSSI measured at different timings. Furthermore, a co-channel interferences-to-noise ratio $\gamma_m^{cci}$, a first adjacent channel interferences-to-noise ratio $\gamma_1^{aci}$, and a second adjacent channel interferences-to-noise ratio $\gamma_2^{aci}$ may be calculated from the following equations (4) to (6).

$$\gamma_m^{cci} = \frac{I_m^{cci}}{N_o} \quad (4)$$

$$\gamma_1^{aci} = \frac{I_1^{aci}}{N_o} \quad (5)$$

$$\gamma_2^{aci} = \frac{I_2^{aci}}{N_o} \quad (6)$$

$N_o$ represents noise power of a receiver. In addition, as mentioned above, the extraction of the co-channel interferences $I^{cci}$, the first adjacent channel interferences $I_1^{aci}$ and the second adjacent channel interferences $I_2^{aci}$, as well as the calculation of equations (4) to (6), may be performed fully or partly by the base station or spectrum management device.

Exemplarily, the measurement configuration may include a co-channel interferences-to-noise ratio threshold and an adjacent-channel interferences-to-noise ratio threshold. In this case, the performing unit 402 may be configured to calculate the co-channel interferences-to-noise ratio and the adjacent-channel interferences-to-noise ratio according to the measurement results (as in the above equations (4) to (6)), and compare the calculated co-channel interferences-to-noise ratio and adjacent-channel interferences-to-noise ratio with the co-channel interferences-to-noise ratio threshold and the adjacent-channel interferences-to-noise ratio threshold, respectively. The performing unit 402 reports the measurement result only in a case that the calculated co-channel interferences-to-noise ratio is higher than the co-channel interferences-to-noise ratio threshold and/or the calculated adjacent-channel interferences-to-noise ratio is higher than the adjacent-channel interferences-to-noise ratio threshold. Otherwise, the performing unit 402 does not report the measurement result, or sends information indicating that no coexistence interferences are detected to the base station or sends a default value (very low interferences) to the base station, so that the signaling overhead caused by reporting can be greatly reduced.

In this case, the measurement result may include an interference margin, which is a difference between the co-channel interferences-to-noise ratio and the co-channel interferences-to-noise ratio threshold and/or a difference between the adjacent channel interferences-to-noise ratio and the adjacent channel interferences-to-noise ratio threshold. For example, the interference margin is the maximum of these differences.

In addition, the physical quantity to be measured may include a time-domain sampling signal. The performing unit 402 is configured to perform FFT on the time-domain sampling signal, and report power spectral density at each frequency point obtained through the FFT to the base station. In other words, the performing unit 402 acquires the OOBE by performing FFT processing on the time-domain sampling signal.

Figure 18:
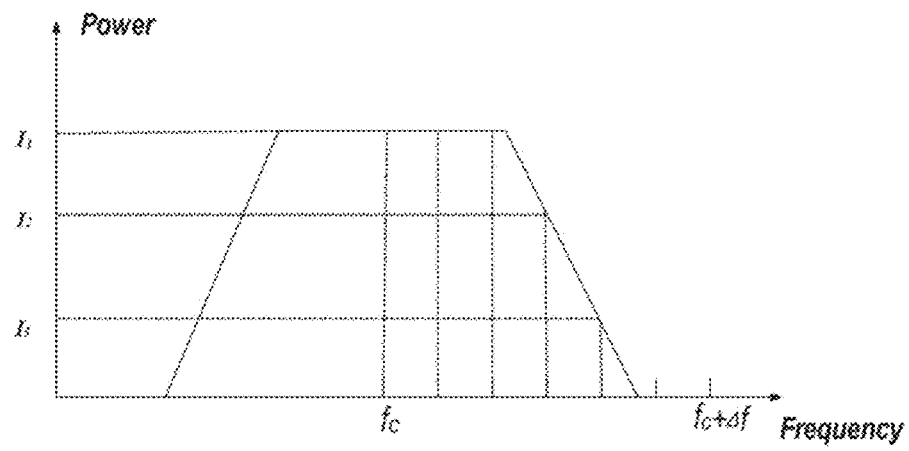
FIG. 18 shows an example of construction of an out of band emission model at a frequency point $f_c$.

Specifically, the measurement frequency points obtained according to the measurement configuration are fc+Δf, fc+2Δf, . . . , where fc is a center frequency point of a measured channel, and Δf is a measurement interval (for example, Δf=5 MHz). The measurement time is during an idle period of a cell (for example, a guard period of the uplink-downlink conversion of the TDD cell, or an idle channel evaluation period or the idle period of the LBT cell). The uplink and downlink measurement duration (for example, 1 ms or several OFDM symbols, or the like) may be set as needed. For each of set measurement frequency points, the measured time-domain sampling signals are $r_1$, $r_2$, . . . respectively. The performing unit 402 performs FFT on the time-domain sampling signal, and may acquire the OOBE parameters at the corresponding frequency points. FIG. 18 shows an example of the construction of the OOBE at the frequency point fc.

In addition, according to the constructed OOBE, the interference model of adjacent channel interferences between resource utilization systems adopting different RATs may be obtained. The EUD and the CBSD in the LTE-TDD system are taken as examples.

Taking the LTE-LBT system performing uplink transmission and the LTE-TDD system performing downlink transmission as an example, where the LTE-TDD system is an interfered system and the LTE-LBT system is an interfering system, cumulative adjacent channel interferences subjected to by an i-th EUD in the TDD are calculated from the following equation (7).

$$I_i^{EUD} = \sum_{j \in \theta_{LBT}} P_j \cdot A_{ji} \cdot \Omega(i, j, GB) \quad (7)$$

$I_i^{EUD}$ represents the cumulative adjacent channel interferences subjected to by an i-th EUD in the TDD, $\theta_{LBT}$ represents a user set in the LBT system, $P_j$ represents emission power of a j-th EUD in the LBT system, $A_{ji}$ represents path loss from the j-th LBT user to the i-th TDD user, $\Omega$ represents the constructed OOBE, and GB represents the width of the guard band between the two cells.

In addition, taking the LTE-LBT system performing uplink transmission and the LTE-TDD system performing uplink transmission as an example, where the LTE-TDD system is the interfered system and the LTE-LBT system is the interfering system, the cumulative adjacent channel interferences subjected to by the CBSD of the TDD are calculated from the following equation (8).

$$I_{tdd}^{BS} = \sum_{j \in \theta_{LBT}} P_j \cdot A_{j \to tdd} \cdot \Omega(tdd, j, GB) \quad (8)$$

$I_{tdd}^{BS}$ represents the cumulative adjacent channel interferences received by the TDD base station, $\theta_{LBT}$ represents a user set in the LBT system, $P_j$ represents emission power of a j-th EUD in the LBT system, $A_{j \to tdd}$ represents path loss from the j-th LBT user to the TDD base station, $\Omega$ represents the constructed OOBE, and GB represents the width of the guard band between the two cells.

In summary, the electronic apparatus 400 according to this embodiment can accurately measure the interferences between resource utilization systems adopting different RATs.

Fifth Embodiment

In the above description of embodiments of the electronic apparatuses for wireless communications, it is apparent that some processing and methods are further disclosed. In the following, a summary of the methods are described without repeating details that are described above. However, it should be noted that although the methods are disclosed when describing the electronic apparatuses for wireless communications, the methods are unnecessary to adopt those components or to be performed by those components described above. For example, implementations of the electronic apparatuses for wireless communications may be partially or completely implemented by hardware and/or firmware. Methods for wireless communications to be discussed blow may be completely implemented by computer executable programs, although these methods may be implemented by the hardware and/or firmware for implementing the electronic apparatuses for wireless communications.

Figure 19:
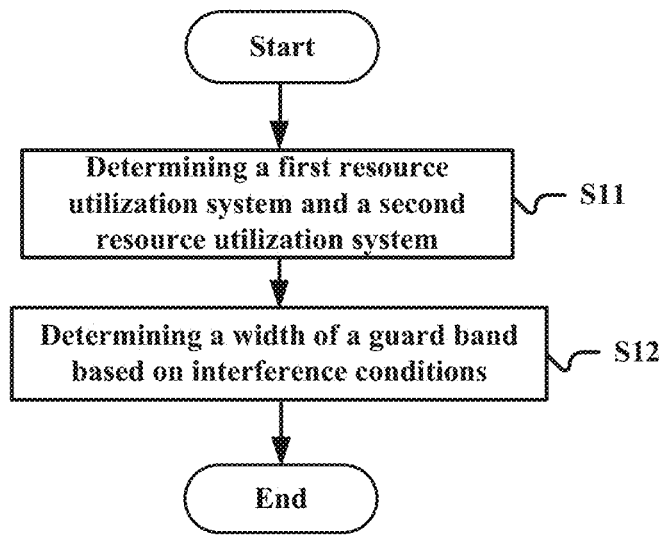
FIG. 19 is a flowchart of a method for wireless communications according to an embodiment of the present disclosure.

FIG. 19 is a flowchart of a method for wireless communications according to an embodiment of the present disclosure. The method includes: determining a first resource utilization system and a second resource utilization system within a management range of a spectrum management device, which interfere with each other and adopt different radio access technologies respectively (S11); and determining, based on interference conditions between the first resource utilization system and the second resource utilization system, a width of a guard band between spectrum resources allocated to the first resource utilization system and those allocated to the second resource utilization system (S12). This method may be performed at a side of a spectrum management device or a central management device.

For example, in step S11, the first resource utilization system and the second resource utilization system may be determined based on an interference overlapping map. In the interference overlapping map, an edge is connected between a first vertex representing the first resource utilization system and a second vertex representing the second resource utilization system.

In step S12, the width of the guard band is determined based on the measurement result of interferences measuring performed by the terminal device located in the overlapping region of the first resource utilization system and the second resource utilization system. For example, the measurement result may include one or more of the following: co-channel interferences, adjacent channel interferences, a co-channel interferences-to-noise ratio, an adjacent channel interferences-to-noise ratio, an out of band emission model of the first resource utilization system and/or the second resource utilization system.

Step S12 may also include the following sub-steps: instructing one of the first resource utilization system and the second resource utilization system to perform measurement configuration on its one or more terminal devices located in the overlapping region. In this step, one or more pieces of the following information may be provided to the base station of one of the first resource utilization system and the second resource utilization system for measurement configuration: a measurement frequency list, measurement time, measurement duration, a physical quantity to be measured, a measurement result reporting format, a reporting rule, a co-channel interferences-to-noise ratio threshold, an adjacent channel interferences-to-noise ratio threshold.

In step S12, the width of the guard band may be determined so that the interferences the first resource utilization system is subjected to from the second resource utilization system is kept within a predetermined range. In a case that a measurement result of the interferences between the first resource utilization system and the second resource utilization system is within the predetermined range, the width of the guard band may be set to 0. In order to maintain accuracy and stability, the width of the guard band may be determined under the condition that the interference conditions are maintained for a predetermined period.

In an example, the terminal device is served by the first resource utilization system. The measurement result includes the co-channel interferences-to-noise ratio and the adjacent-channel interferences-to-noise ratio of the terminal device, and the out of band emission model of the second resource utilization system. In step S12, a difference between the co-channel interferences-to-noise ratio and a co-channel interferences-to-noise ratio threshold and a difference between the adjacent-channel interferences-to-noise ratio and an adjacent-channel interferences-to-noise ratio threshold are calculated as an interference margin, and the width of the guard band is determined based on the interference margin and the above-mentioned out of band emission model.

The weight for the edge between the first vertex and the second vertex in the interference overlapping map may be calculated based on the width of the guard band. For example, a size of the guard band is an integer multiple of a fixed bandwidth, and the weight is a multiple of the guard band relative to the fixed bandwidth.

In addition, the above method may further include: updating the interference overlapping map based on the weight, and allocate spectrum resources based on the updated interference overlapping map. For example, the spectrum resources may be allocated to a resource utilization system corresponding to the edge with a high weight in the interference overlapping map.

Figure 20:
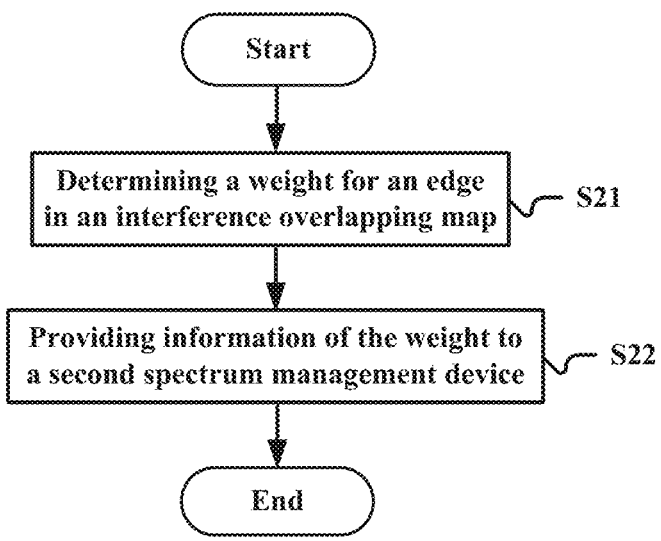
FIG. 20 is a flowchart of a method for wireless communications according to another embodiment of the present disclosure.

FIG. 20 is a flowchart of a method for wireless communications according to another embodiment of the present disclosure. The method includes: determining a weight of an edge in an interference overlapping map (S21), where vertexes represent respective resource utilization systems managed by a first spectrum management device and an edge is connected between two resource utilization systems which interfere with each other, where the weight for the edge represents a width of a guard band to be set when the resource utilization systems corresponding to the edge adopt different radio access technologies; and providing information of the weight to a second spectrum management device (S22). This method may be performed at a side of a spectrum management device or a central management device.

The first spectrum management device and the second spectrum management device may be both CxMs. Alternatively, the first spectrum management device and the second spectrum management device are both SASs or GSCs. In step S21, the information of the determined weight for the edge may also be obtained from the second spectrum management device. In a case that the weight determined by the first spectrum management device is inconsistent with the weight obtained from the second spectrum management device for the same edge, the above method further includes: setting the weight for the edge based on the two weights. For example, an average of these two weights is calculated as the weight for the edge or a maximum of these two weights is selected as the weight for the edge.

In addition, the first spectrum management device may be a CxM, and the second spectrum management device may be an SAS or GSC. Alternatively, the first spectrum management device is an SAS or GSC, and the second spectrum management device is at least one CxM.

Figure 21:
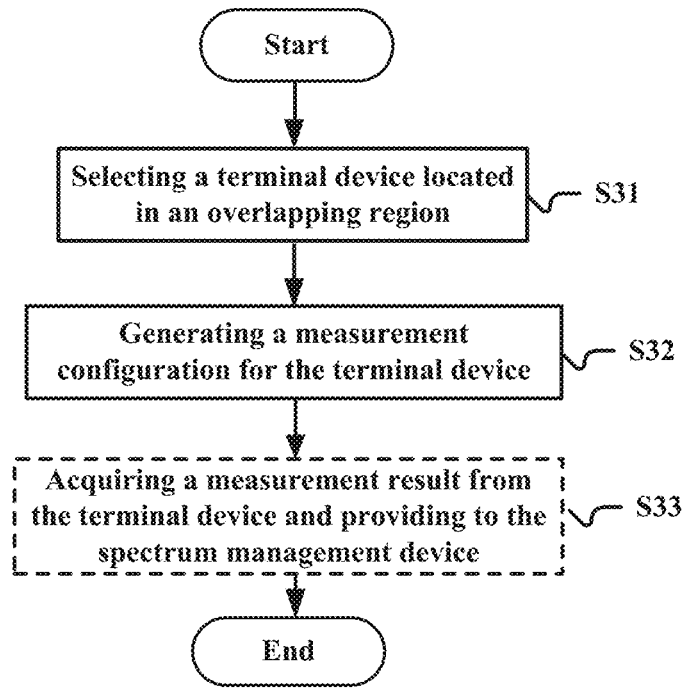
FIG. 21 is a flowchart of a method for wireless communications according to another embodiment of the present disclosure.

FIG. 21 is a flowchart of a method for wireless communications according to another embodiment of the present disclosure. The method includes: selecting a terminal device located in an overlapping region of a serving resource utilization system and another resource utilization system (S31), where the serving resource utilization system and the other resource utilization system adopt different radio access technologies; and generating a measurement configuration for use by the terminal device to perform interference measuring (S32). The method may be performed at a side of a base station.

As shown in a dashed line block in FIG. 21, the above method may further include step S33: obtaining a measurement result from the terminal device and providing the measurement result to the spectrum management device. In addition, step S33 may be implemented as: obtaining the measurement result from the terminal device, and calculating the co-channel interferences-to-noise ratio, the adjacent-channel interferences-to-noise ratio, and the out of band emission model of the other resource utilization system based on the measurement result; and providing a calculation result to the spectrum management device.

Figure 22:
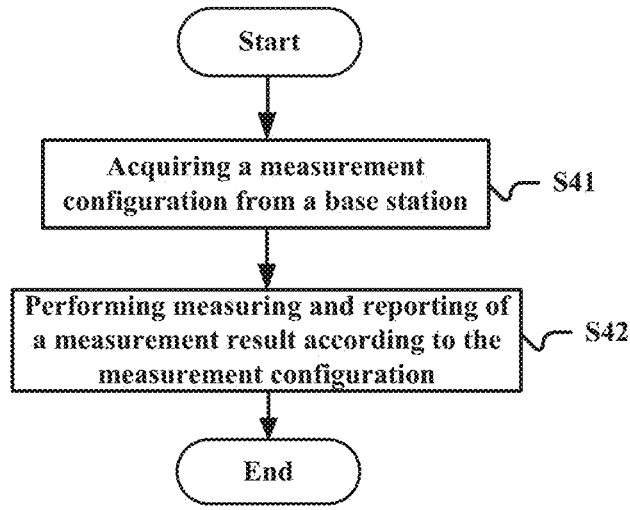
FIG. 22 is a flowchart of a method for wireless communications according to another embodiment of the present disclosure.

FIG. 22 is a flowchart of a method for wireless communications according to another embodiment of the present disclosure. The method includes: acquiring a measurement configuration from a base station (S41), the measurement configuration being utilized for measuring interferences induced by another resource utilization system adopting a different radio access technology; and performing measuring and reporting of a measurement result according to the measurement configuration (S42). The method may be performed at a side of user equipment.

In an example, the physical quantity to be measured includes a time-domain sampling signal. In step S42, FFT is performed on the time-domain sampling signal, and power spectral density at each frequency point obtained through the FFT is reported to the base station.

It is worth noting that the above methods may be utilized in combination or separately, and the details of which are described in detail in the first to fourth embodiments, and are not repeated here.

Figure 23:
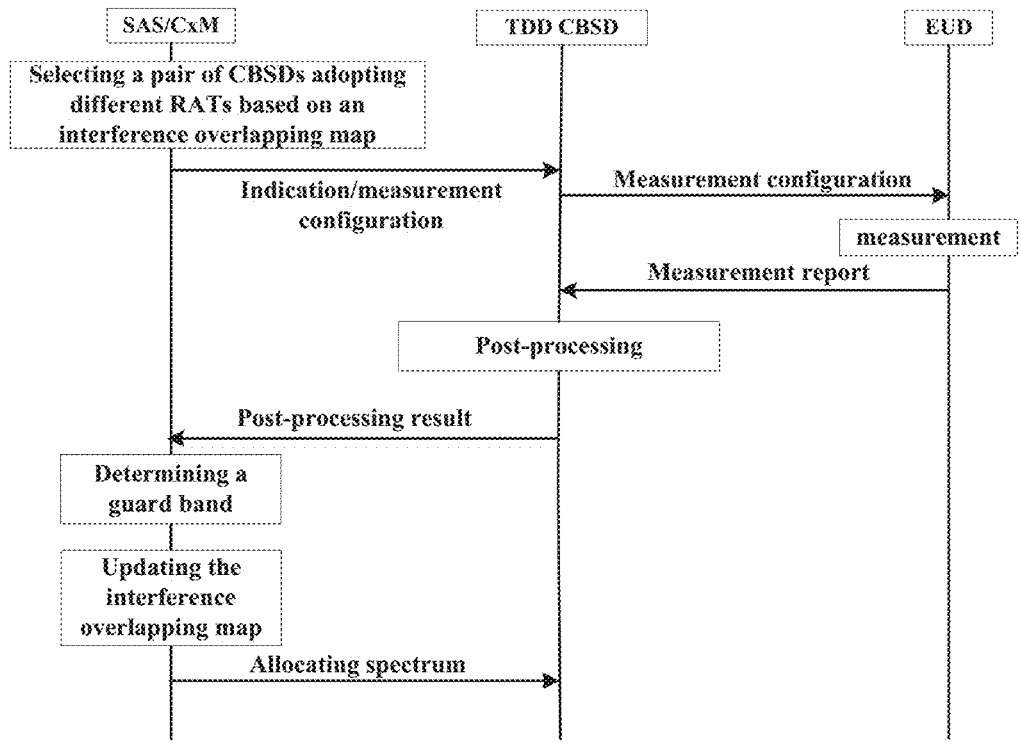
FIG. 23 shows an example of an information procedure among a spectrum management device, a base station and a terminal device.

For ease of understanding, FIG. 23 further shows an example of an information procedure among a spectrum management device, a base station and a terminal device. The spectrum management device is an SAS/CxM, the base station is a TDD-CBSD, and the terminal device is a EUD. First, the SAS/CxM selects a pair of CBSDs with an edge connected between their corresponding vertexes and adopting different RATs based on an initial interference overlapping map, and instructs the TDD-CBSD to configure the EUD in the overlapping region to perform interference measuring. In this case, information for measurement configuration may also be sent to the TDD-CBSD. The TDD-CBSD then selects the EUD in the overlapping region and sends the measurement configuration to the EUD. The selected EUD performs interference measuring according to the received measurement configuration and reports the measurement result to the TDD-CBSD. The TDD-CBSD performs post-processing on the received measurement result, such as calculating the interference margin, the OOBE and the like, and then sends a post-processing result to the SAS/CxM. The SAS/CxM determines the guard band and updates the interference overlapping map based on these results, and allocates spectrum for the TDD-CBSD based on the updated interference overlapping map.

It should be noted that FIG. 23 is only an example of the information procedure and is not restrictive, and various modifications and changes may be made to the information procedure according to the present disclosure.

Figure 24:
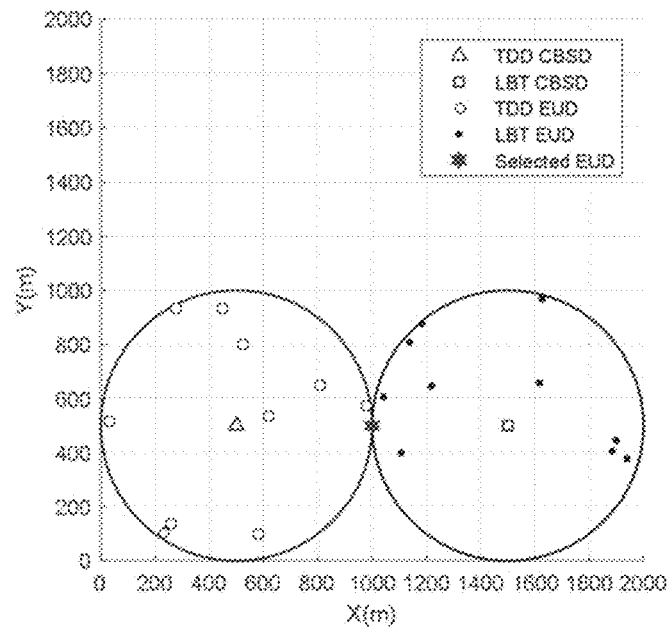
FIG. 24 shows a schematic diagram showing a scenario where an LTE-TDD cell and an LTE-LBT cell coexist.

In addition, in order to facilitate the understanding of the main points of the present disclosure, a simulation example for the purpose of illustration and not limitation is also given below. FIG. 24 shows a schematic diagram showing a scenario where an LTE-TDD cell and an LTE-LBT cell coexist. A large circle on the left represents the LTE-TDD cell, and a large circle on the right represents the LTE-LBT cell. The LTE-TDD cell and the LTE-LBT cell are adjacent to each other. A coverage radius of the LTE-TDD cell and a coverage radius of the LTE-LBT cell are both 500 m. There are 10 EUDs randomly distributed in the LTE-TDD cell, which are represented by small hollow circles. There are also 10 EUDs randomly distributed in the LTE-LBT cell, which are represented by solid dots. According to the present disclosure, a EUD in the overlapping region of the two cells is selected for measurement, and the EUD is represented by a five-pointed star in FIG. 24.

In the simulation, a free-space propagation model is utilized, and the shadow fading of log-normal distribution is considered, with a mean value of 0 and a variance of 3 dB. It is assumed that emission power of CBSD is 20 dBm, emission power of EUD is 10 dBm, and the adjacent channel interference threshold is set to −100 dBm. In addition, it is assumed that the uplink and downlink configuration of the LTE-TDD is 3:6, the LTE-LBT adopts the fixed FBE (frame based equipment)-LBT mode, a minimum channel evaluation period is 20 μs which is negligible, channel occupation period is 9 ms, idle period is 1 ms, and a frame period is set to 9 ms+1 ms=10 ms. The simulation duration is 20 ms. It is assumed that the LTE-LBT cell performs uplink and downlink transmission in turn according to the frame cycle, that is, a first frame is utilized for downlink transmission, a second frame is utilized for uplink transmission, and so on.

Figure 25:
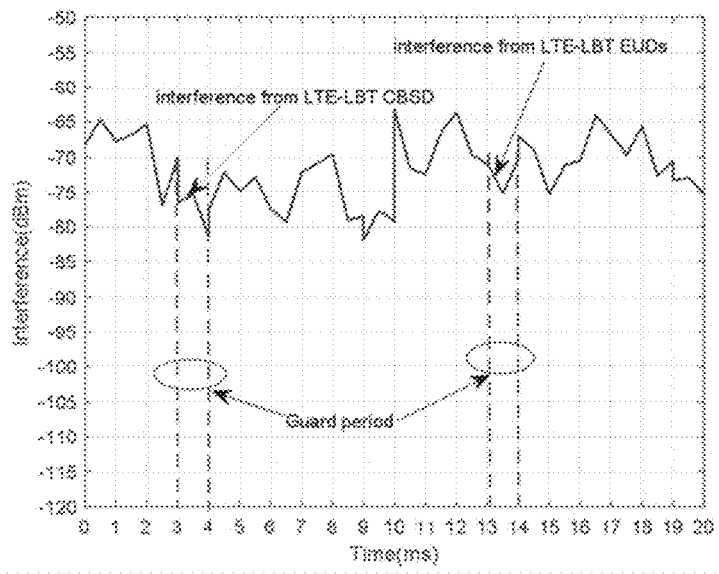
FIG. 25 shows a graph of interferences measured by an end user device for measurement, in a case that an LTE-TDD cell and an LTE-LBT cell adopt the same channel.
Figure 26:
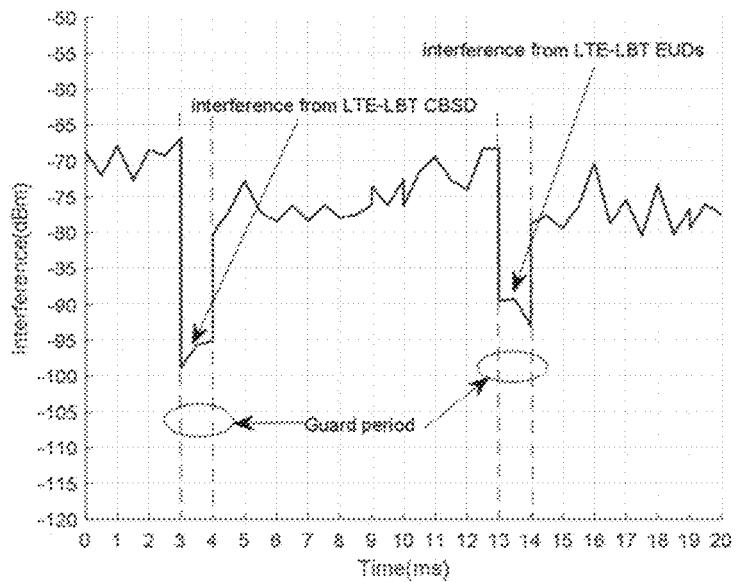
FIGS. 26 and 27 show graphs of interferences measured by an end user device for measurement, in a case that an LTE-TDD cell and an LTE-LBT cell adopt adjacent channels.
Figure 27:
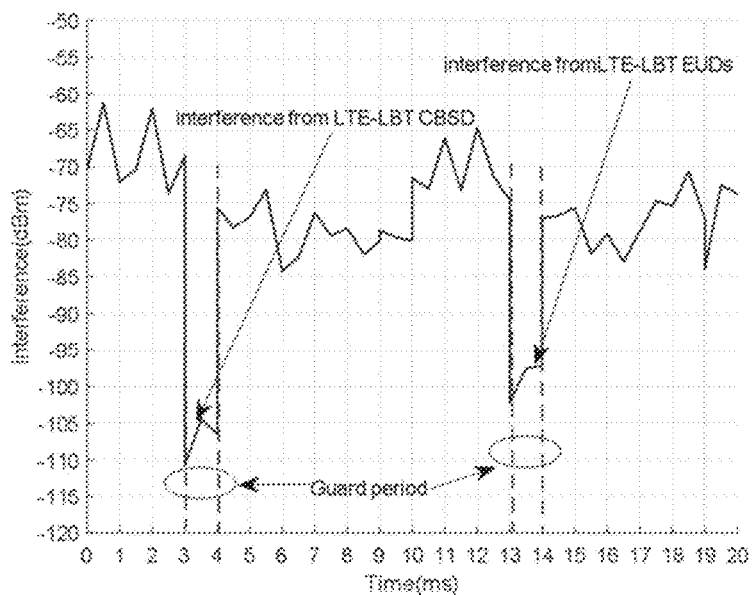

FIG. 25 shows a graph of interferences measured by an EDU for measurement in a case that an LTE-TDD cell and an LTE-LBT cell adopt the same channel. In this example, it may be considered that the guard band GB is 0 MHz. FIGS. 26 and 27 show graphs of interferences measured by the EDU for measurement in a case that an LTE-TDD cell and an LTE-LBT cell adopt adjacent channels, respectively. In the example shown in FIG. 26, a center frequency interval of adjacent channels is 5 MHz, that is, a guard band GB of 5 MHz is set between the LTE-TDD cell and the LTE-LBT cell. In the example shown in FIG. 27, the center frequency interval of adjacent channels is 10 MHz, that is, a guard band GB of 10 MHz is set between the LTE-TDD cell and the LTE-LBT cell.

FIGS. 25 to 27 show interferences measured by the EUD in a guard period (GP). It can be seen that the interferences measured by the EUD in the GP time period (for example, in the 4 ms of a first frame) changes significantly with the change of the guard band. In the 4 ms of the first frame, the measured interferences at GB=0 MHz are −75 dBm, which are the co-channel interferences generated by the LTE-LBT CBSD. The measured interferences at GB=5 MHz are −95 dBm, which are the adjacent-channel interferences generated by the LTE-LBT CBSD. The measured interferences at GB=10 MHz are −105 dBm, which are the adjacent-channel interferences generated by the LTE-LBT CBSD.

Figure 28:
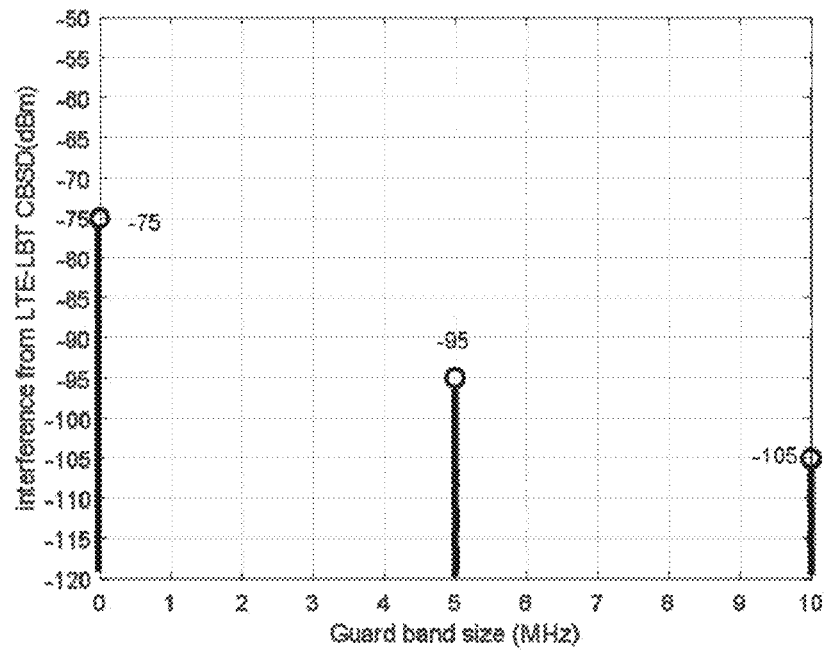
FIG. 28 shows a diagram of interferences caused by an LTE-LBT base station to an adjacent LTE-TDD cell in the case of different guard bands.

FIG. 28 shows the interferences caused by LTE-LBT CBSD to an adjacent LTE-TDD cell in cases of GB=0 MHz, 5 MHz, and 10 MHz in the first frame. In a case that the adjacent channel interferences threshold are −100 dBm, the adjacent channel interferences exceed the interference threshold both in a case that the LTE-LBT cell and the LTE-TDD cell adopt the same channel (that is GB=0 MHz) and in a case that they adopt adjacent channel (GB=5 MHZ). In the case that the guard band is set to 10 MHZ, the adjacent channel interferences can meet the interferences guard threshold requirement, thereby verifying effectiveness of the guard band adjustment of the present disclosure.

The technology according to the present disclosure is applicable to various products.

For example, the electronic apparatuses 100 and 200 may be implemented as any type of server, such as a tower server, a rack server, and a blade server. The electronic apparatuses 100 and 200 may be a control module (such as an integrated circuitry module including a single chip, and a card or blade inserted into a slot of the blade server) installed on the server.

For example, the electronic apparatus 300 may be implemented as various base stations. The base station may be implemented as any type of evolved node B (eNB) or gNB (a 5G base station). The eNB includes, for example, a macro eNB and a small eNB. The small eNB may be an eNB covering a cell smaller than a macro cell, such as a pico eNB, a micro eNB, and a home (femto) eNB. The case for the gNB is similar to the above. Alternatively, the base station may be implemented as any other type of base station, such as a NodeB and a base transceiver station (BTS). The base station may include: a main body (also referred to as a base station apparatus) configured to control wireless communication; and one or more remote radio head ends (RRH) located at positions different from the main body. In addition, various types of user equipments may each serve as a base station by performing functions of the base station temporarily or semi-permanently.

The electronic apparatus 400 may be implemented as various user equipments. The user equipment may be implemented as a mobile terminal (such as a smartphone, a tablet personal computer (PC), a notebook PC, a portable game terminal, a portable/dongle-type mobile router, and a digital camera device) or an in-vehicle terminal such as a car navigation apparatus. The user equipment may also be implemented as a terminal (also referred to as a machine type communication (MTC) terminal) that performs machine-to-machine (M2M) communication. In addition, the user equipment may be a wireless communication module (such as an integrated circuit module including a single chip) mounted on each of the terminals described above.

[Application Example Regarding a Server]

Figure 29:
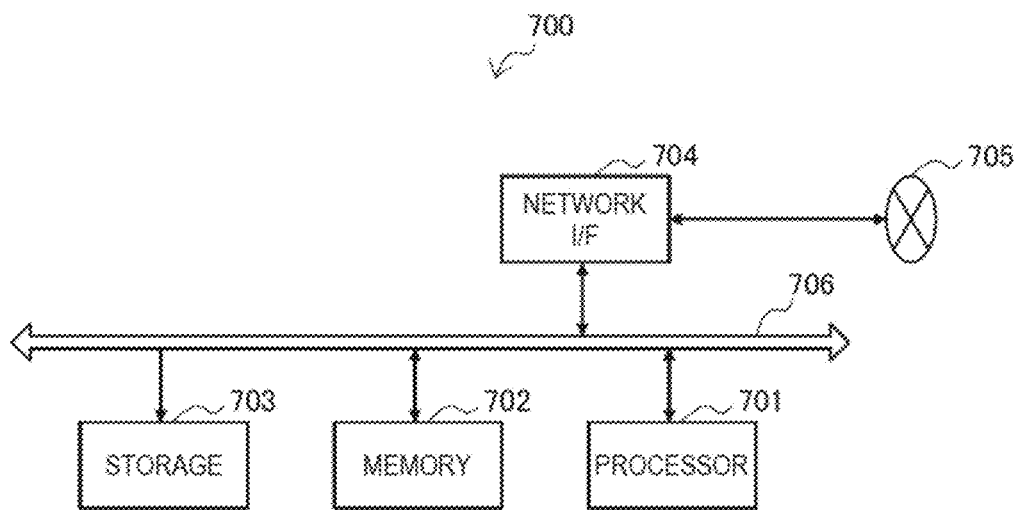
FIG. 29 is a block diagram showing an example of a schematic configuration of a server to which the technology of the present disclosure may be applied.

FIG. 29 is a block diagram showing an example of a schematic configuration of a server 700 to which the technology of the present disclosure may be applied. The server 700 includes a processor 701, a memory 702, a storage 703, a network interface (I/F) 704, and a bus 706.

The processor 701 may be, for example, a central processing unit (CPU) or a digital signal processor (DSP), and controls functions of the server 700. The memory 702 includes random access memory (RAM) and read only memory (ROM), and stores data and programs executed by the processor 701. The storage 703 may include a storage medium, such as a semiconductor memory and a hard disk.

The network interface 704 is a communication interface for connecting the server 700 to a communication network 705. The communication network 705 may be a core network such as an evolved packet core network (EPC) or a packet data network (PDN) such as the Internet.

The processor 701, the memory 702, the storage 703, and the network interface 704 are connected to each other via a bus 706. The bus 706 may include two or more buses (such as a high-speed bus and a low-speed bus) having different speeds.

In the server 700 shown in FIG. 29, the first determining unit 101 and the second determining unit 102 described with reference to FIG. 1, the instructing unit 103 described with reference to FIG. 4, and the distributing unit 104 described with reference to FIG. 6 may be implemented by the processor 701. For example, the processor 701 may determine the width of the guard band between two resource utilization systems adopting different RATs by performing the functions of the first determining unit 101 and the second determining unit 102. The processor 701 may instruct the terminal device in the overlapping region to perform interference measuring by performing the function of the instructing unit 103. The processor 701 may allocate spectrum resources based on the updated interference overlapping map by performing the function of the allocating unit 104. The determining unit 201 and the providing unit 202 described with reference to FIG. 10 may be implemented by the processor 701. For example, the processor 701 may provide other spectrum management devices with information of the weight for the edge by performing functions of the determining unit 201 and the providing unit 202.

[Application Example Regarding a Base Station]

First Application Example

Figure 30:
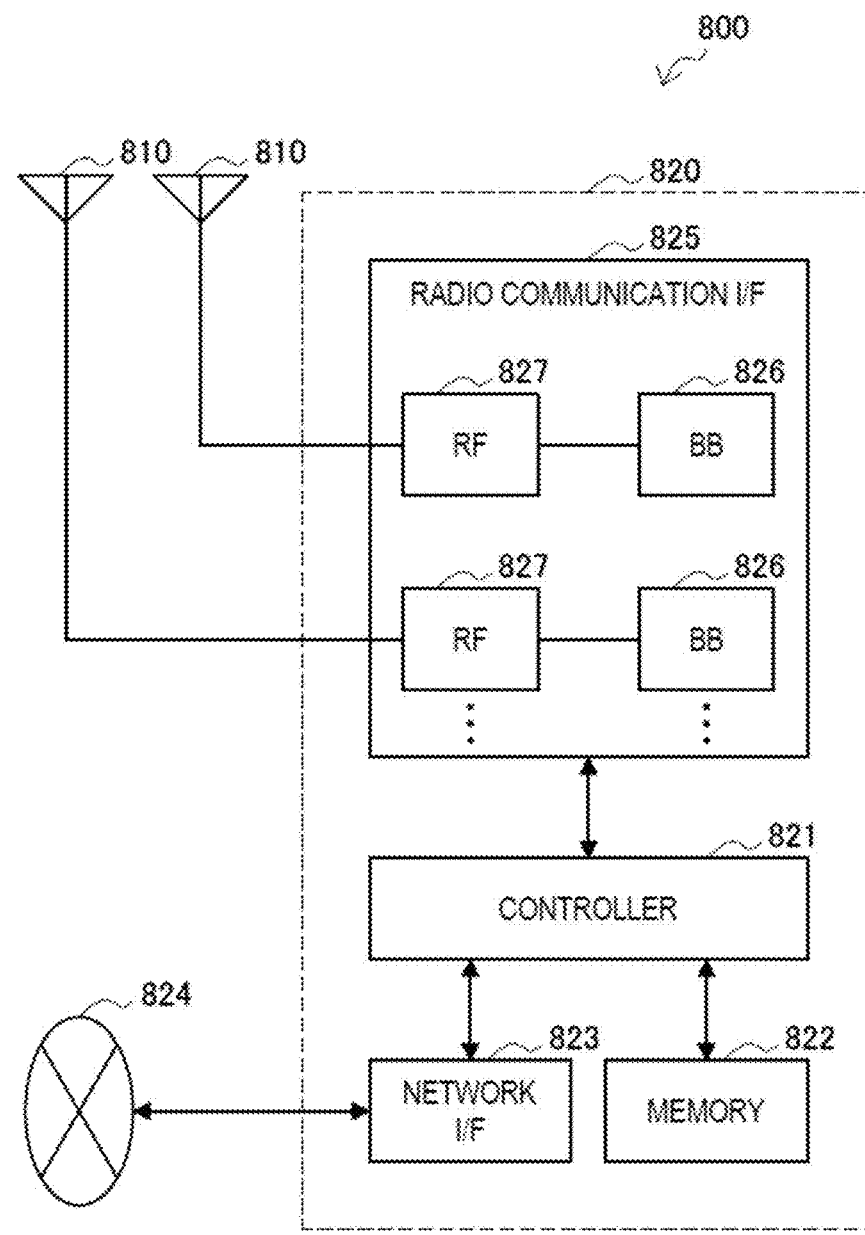
FIG. 30 is a block diagram showing a first example of an exemplary configuration of an eNB or gNB to which the technology of the present disclosure may be applied.

FIG. 30 is a block diagram showing a first example of an exemplary configuration of an eNB or gNB to which technology according to the present disclosure may be applied. It should be noted that the following description is given by taking the eNB as an example, which is also applicable to the gNB. An eNB 800 includes one or more antennas 810 and a base station apparatus 820. The base station apparatus 820 and each of the antennas 810 may be connected to each other via a radio frequency (RF) cable.

Each of the antennas 810 includes a single or multiple antennal elements (such as multiple antenna elements included in a multiple-input multiple-output (MIMO) antenna), and is used for the base station apparatus 820 to transmit and receive wireless signals. As shown in FIG. 30, the eNB 800 may include the multiple antennas 810. For example, the multiple antennas 810 may be compatible with multiple frequency bands used by the eNB 800. Although FIG. 30 shows the example in which the eNB 800 includes the multiple antennas 810, the eNB 800 may also include a single antenna 810.

The base station apparatus 820 includes a controller 821, a memory 822, a network interface 823, and a radio communication interface 825.

The controller 821 may be, for example, a CPU or a DSP, and operates various functions of a higher layer of the base station apparatus 820. For example, the controller 821 generates a data packet from data in signals processed by the radio communication interface 825, and transfers the generated packet via the network interface 823. The controller 821 may bundle data from multiple base band processors to generate the bundled packet, and transfer the generated bundled packet. The controller 821 may have logical functions of performing control such as radio resource control, radio bearer control, mobility management, admission control and scheduling. The control may be performed in corporation with an eNB or a core network node in the vicinity. The memory 822 includes a RAM and a ROM, and stores a program executed by the controller 821 and various types of control data (such as terminal list, transmission power data and scheduling data).

The network interface 823 is a communication interface for connecting the base station apparatus 820 to a core network 824. The controller 821 may communicate with a core network node or another eNB via the network interface 823. In this case, the eNB 800, and the core network node or another eNB may be connected to each other via a logic interface (such as an SI interface and an X2 interface). The network interface 823 may also be a wired communication interface or a wireless communication interface for wireless backhaul. If the network interface 823 is a wireless communication interface, the network interface 823 may use a higher frequency band for wireless communication than that used by the radio communication interface 825.

The radio communication interface 825 supports any cellular communication scheme (such as Long Term Evolution (LTE) and LTE-advanced), and provides wireless connection to a terminal located in a cell of the eNB 800 via the antenna 810. The radio communication interface 825 may typically include, for example, a baseband (BB) processor 826 and an RF circuit 827. The BB processor 826 may perform, for example, encoding/decoding, modulating/demodulating, and multiplexing/demultiplexing, and performs various types of signal processing of layers (such as L1, Media Access Control (MAC), Radio Link Control (RLC), and a Packet Data Convergence Protocol (PDCP)). The BB processor 826 may have a part or all of the above-described logical functions instead of the controller 821. The BB processor 826 may be a memory storing communication control programs, or a module including a processor and a related circuit configured to execute the programs. Updating the program may allow the functions of the BB processor 826 to be changed. The module may be a card or a blade that is inserted into a slot of the base station apparatus 820. Alternatively, the module may also be a chip that is mounted on the card or the blade. Meanwhile, the RF circuit 827 may include, for example, a mixer, a filter, and an amplifier, and transmits and receives wireless signals via the antenna 810.

As shown in FIG. 30, the radio communication interface 825 may include the multiple BB processors 826. For example, the multiple BB processors 826 may be compatible with multiple frequency bands used by the eNB 800. The radio communication interface 825 may include multiple RF circuits 827, as shown in FIG. 30. For example, the multiple RF circuits 827 may be compatible with multiple antenna elements. Although FIG. 30 shows the example in which the radio communication interface 825 includes the multiple BB processors 826 and the multiple RF circuits 827, the radio communication interface 825 may also include a single BB processor 826 and a single RF circuit 827.

In the eNB 800 shown in FIG. 30, a transceiver of the electronic apparatus 300 may be implemented by the radio communication interface 825. At least a part of functions may also be implemented by the controller 821. For example, the controller 821 may select the terminal device in the overlapping region, generate a measurement configuration for the terminal device, and acquire the measurement result of the terminal device by performing functions of the selecting unit 301, the generating unit 302, and the acquiring unit 303, respectively.

Second Application Example

Figure 31:
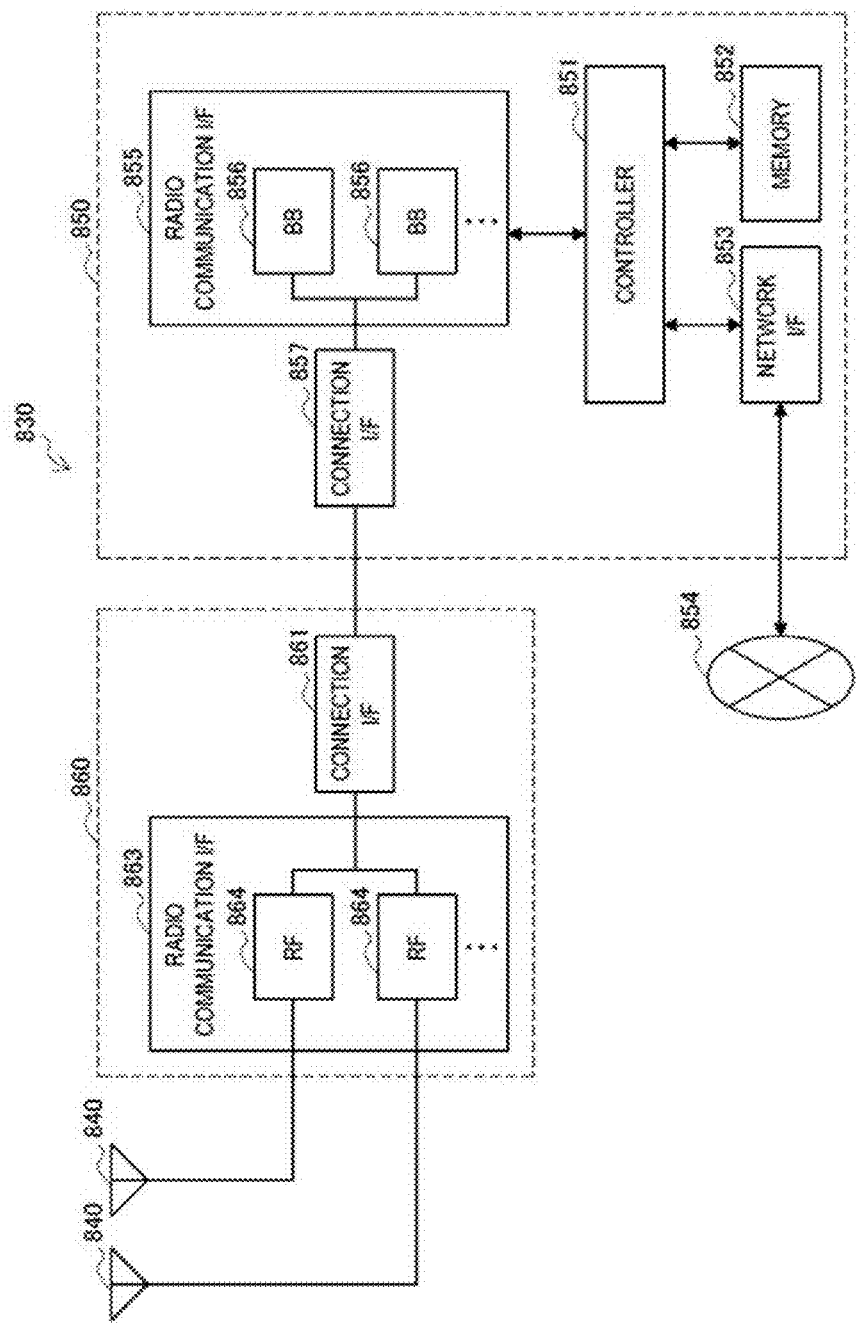
FIG. 31 is a block diagram showing a second example of an exemplary configuration of an eNB or gNB to which the technology of the present disclosure may be applied.

FIG. 31 is a block diagram showing a second example of the exemplary configuration of an eNB or gNB to which the technology according to the present disclosure may be applied. It should be noted that the following description is given by taking the eNB as an example, which is also applied to the gNB. An eNB 830 includes one or more antennas 840, a base station apparatus 850, and an RRH 860. The RRH 860 and each of the antennas 840 may be connected to each other via an RF cable. The base station apparatus 850 and the RRH 860 may be connected to each other via a high speed line such as an optical fiber cable.

Each of the antennas 840 includes a single or multiple antennal elements (such as multiple antenna elements included in an MIMO antenna), and is used for the RRH 860 to transmit and receive wireless signals. As shown in FIG. 31, the eNB 830 may include the multiple antennas 840. For example, the multiple antennas 840 may be compatible with multiple frequency bands used by the eNB 830. Although FIG. 31 shows the example in which the eNB 830 includes the multiple antennas 840, the eNB 830 may also include a single antenna 840.

The base station apparatus 850 includes a controller 851, a memory 852, a network interface 853, a radio communication interface 855, and a connection interface 857. The controller 851, the memory 852, and the network interface 853 are the same as the controller 821, the memory 822, and the network interface 823 described with reference to FIG. 30.

The radio communication interface 855 supports any cellular communication scheme (such as LTE and LTE-advanced), and provides wireless communication to a terminal located in a sector corresponding to the RRH 860 via the RRH 860 and the antenna 840. The radio communication interface 855 may typically include, for example, a BB processor 856. The BB processor 856 is the same as the BB processor 826 described with reference to FIG. 30, except that the BB processor 856 is connected to an RF circuit 864 of the RRH 860 via the connection interface 857. As show in FIG. 31, the radio communication interface 855 may include the multiple BB processors 856. For example, the multiple BB processors 856 may be compatible with multiple frequency bands used by the eNB 830. Although FIG. 31 shows the example in which the radio communication interface 855 includes the multiple BB processors 856, the radio communication interface 855 may also include a single BB processor 856.

The connection interface 857 is an interface for connecting the base station apparatus 850 (radio communication interface 855) to the RRH 860. The connection interface 857 may also be a communication module for communication in the above-described high speed line that connects the base station apparatus 850 (radio communication interface 855) to the RRH 860.

The RRH 860 includes a connection interface 861 and a radio communication interface 863.

The connection interface 861 is an interface for connecting the RRH 860 (radio communication interface 863) to the base station apparatus 850. The connection interface 861 may also be a communication module for communication in the above-described high speed line.

The radio communication interface 863 transmits and receives wireless signals via the antenna 840. The radio communication interface 863 may typically include, for example, the RF circuit 864. The RF circuit 864 may include, for example, a mixer, a filter and an amplifier, and transmits and receives wireless signals via the antenna 840. The radio communication interface 863 may include multiple RF circuits 864, as shown in FIG. 31. For example, the multiple RF circuits 864 may support multiple antenna elements. Although FIG. 31 shows the example in which the radio communication interface 863 includes the multiple RF circuits 864, the radio communication interface 863 may also include a single RF circuit 864.

In the eNB 830 shown in FIG. 31, a transceiver of the electronic apparatus 300 may be implemented by the radio communication interface 855 and/or the radio communication interface 863. At least a part of functions may also be implemented by the controller 851. For example, the controller 851 may select the terminal device in the overlapping region, generate a measurement configuration for the terminal device, and acquire the measurement result of the terminal device by performing functions of the selecting unit 301, the generating unit 302, and the acquiring unit 303, respectively.

Application Example Regarding User Equipment

First Application Example

Figure 32:
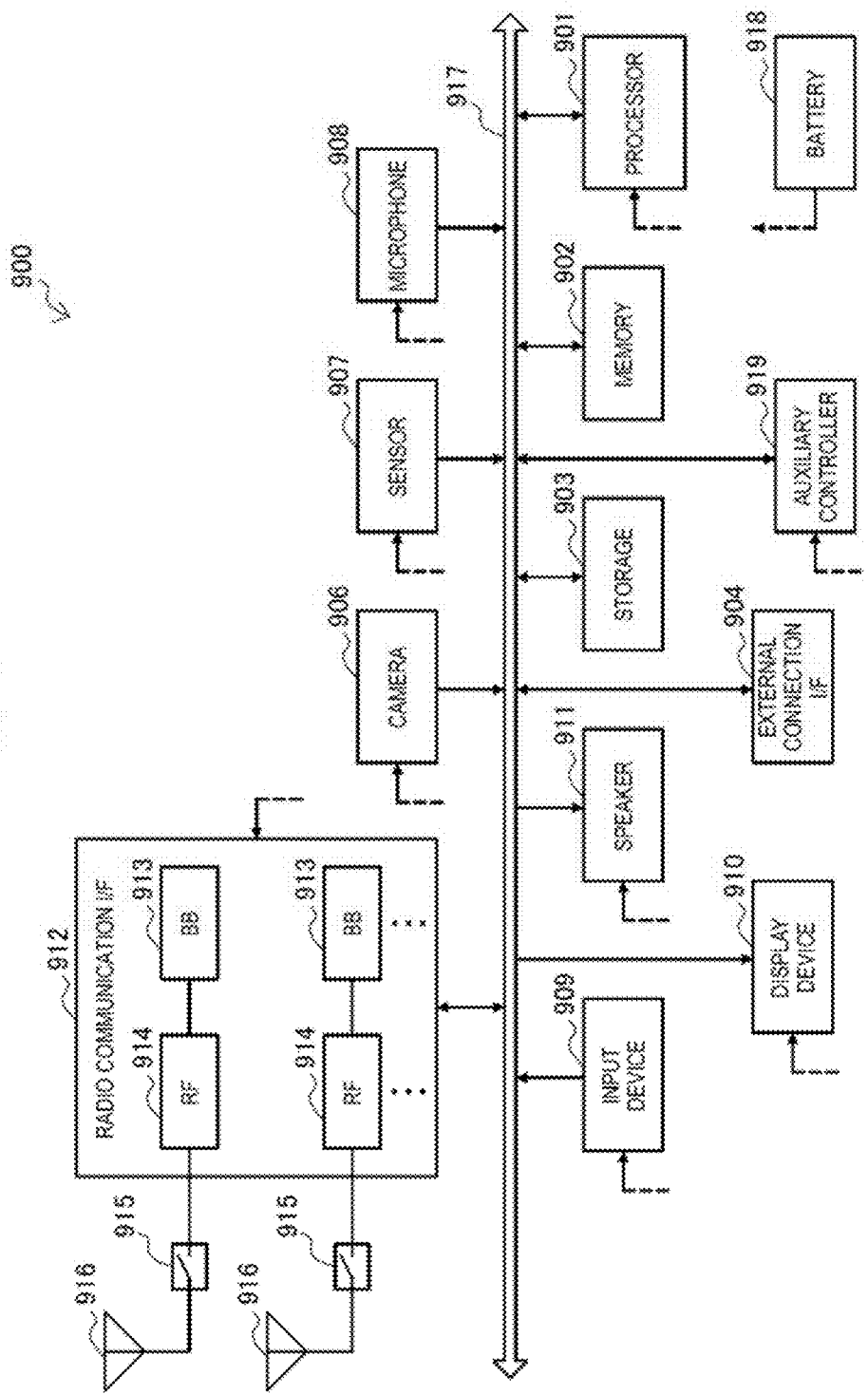
FIG. 32 is a block diagram showing an example of an exemplary configuration of a smartphone to which the technology according to the present disclosure may be applied.

FIG. 32 is a block diagram showing an exemplary configuration of a smartphone 900 to which the technology according to the present disclosure may be applied. The smartphone 900 includes a processor 901, a memory 902, a storage 903, an external connection interface 904, a camera 906, a sensor 907, a microphone 908, an input device 909, a display device 910, a speaker 911, a radio communication interface 912, one or more antenna switches 915, one or more antennas 916, a bus 917, a battery 918, and an auxiliary controller 919.

The processor 901 may be, for example, a CPU or a system on a chip (SoC), and controls functions of an application layer and another layer of the smartphone 900. The memory 902 includes a RAM and a ROM, and stores a program executed by the processor 901 and data. The storage 903 may include a storage medium such as a semiconductor memory and a hard disk. The external connection interface 904 is an interface for connecting an external device (such as a memory card and a universal serial bus (USB) device) to the smartphone 900.

The camera 906 includes an image sensor (such as a charge coupled device (CCD) and a complementary metal oxide semiconductor (CMOS)), and generates a captured image. The sensor 907 may include a group of sensors, such as a measurement sensor, a gyro sensor, a geomagnetism sensor, and an acceleration sensor. The microphone 908 converts sounds that are inputted to the smartphone 900 to audio signals. The input device 909 includes, for example, a touch sensor configured to detect touch onto a screen of the display device 910, a keypad, a keyboard, a button, or a switch, and receives an operation or information inputted from a user. The display device 910 includes a screen (such as a liquid crystal display (LCD) and an organic light-emitting diode (OLED) display), and displays an output image of the smartphone 900. The speaker 911 converts audio signals that are outputted from the smartphone 900 to sounds.

The radio communication interface 912 supports any cellular communication scheme (such as LTE and LTE-advanced), and performs a wireless communication. The radio communication interface 912 may include, for example, a BB processor 913 and an RF circuit 914. The BB processor 913 may perform, for example, encoding/decoding, modulating/demodulating, and multiplexing/de-multiplexing, and perform various types of signal processing for wireless communication. The RF circuit 914 may include, for example, a mixer, a filter and an amplifier, and transmits and receives wireless signals via the antenna 916. It should be noted that although FIG. 32 shows a case that one RF link is connected to one antenna, which is only illustrative, and a case that one RF link is connected to multiple antennas through multiple phase shifters may also exist. The radio communication interface 912 may be a chip module having the BB processor 913 and the RF circuit 914 integrated thereon. The radio communication interface 912 may include multiple BB processors 913 and multiple RF circuits 914, as shown in FIG. 32. Although FIG. 32 shows the example in which the radio communication interface 912 includes the multiple BB processors 913 and the multiple RF circuits 914, the radio communication interface 912 may also include a single BB processor 913 or a single RF circuit 914.

Furthermore, in addition to a cellular communication scheme, the radio communication interface 912 may support another type of wireless communication scheme such as a short-distance wireless communication scheme, a near field communication scheme, and a radio local area network (LAN) scheme. In this case, the radio communication interface 912 may include the BB processor 913 and the RF circuit 914 for each wireless communication scheme.

Each of the antenna switches 915 switches connection destinations of the antennas 916 among multiple circuits (such as circuits for different wireless communication schemes) included in the radio communication interface 912.

Each of the antennas 916 includes a single or multiple antenna elements (such as multiple antenna elements included in an MIMO antenna) and is used for the radio communication interface 912 to transmit and receive wireless signals. The smartphone 900 may include the multiple antennas 916, as shown in FIG. 32. Although FIG. 32 shows the example in which the smartphone 900 includes the multiple antennas 916, the smartphone 900 may also include a single antenna 916.

Furthermore, the smartphone 900 may include the antenna 916 for each wireless communication scheme. In this case, the antenna switches 915 may be omitted from the configuration of the smartphone 900.

The bus 917 connects the processor 901, the memory 902, the storage 903, the external connection interface 904, the camera 906, the sensor 907, the microphone 908, the input device 909, the display device 910, the speaker 911, the radio communication interface 912, and the auxiliary controller 919 to each other. The battery 918 supplies power to blocks of the smart phone 900 shown in FIG. 32 via feeder lines that are partially shown as dashed lines in FIG. 32. The auxiliary controller 919, operates a minimum necessary function of the smart phone 900, for example, in a sleep mode.

In the smartphone 900 shown in FIG. 32, a transceiver of the electronic apparatus 400 may be implemented by the radio communication interface 912. At least a part of functions may also be implemented by the processor 901 or the auxiliary controller 919. For example, the processor 901 or the auxiliary controller 919 may measure the interferences between two resource utilization systems adopting different RATs and report the measurement result by performing functions of the acquiring unit 401 and the performing unit 402.

Second Application Example

Figure 33:
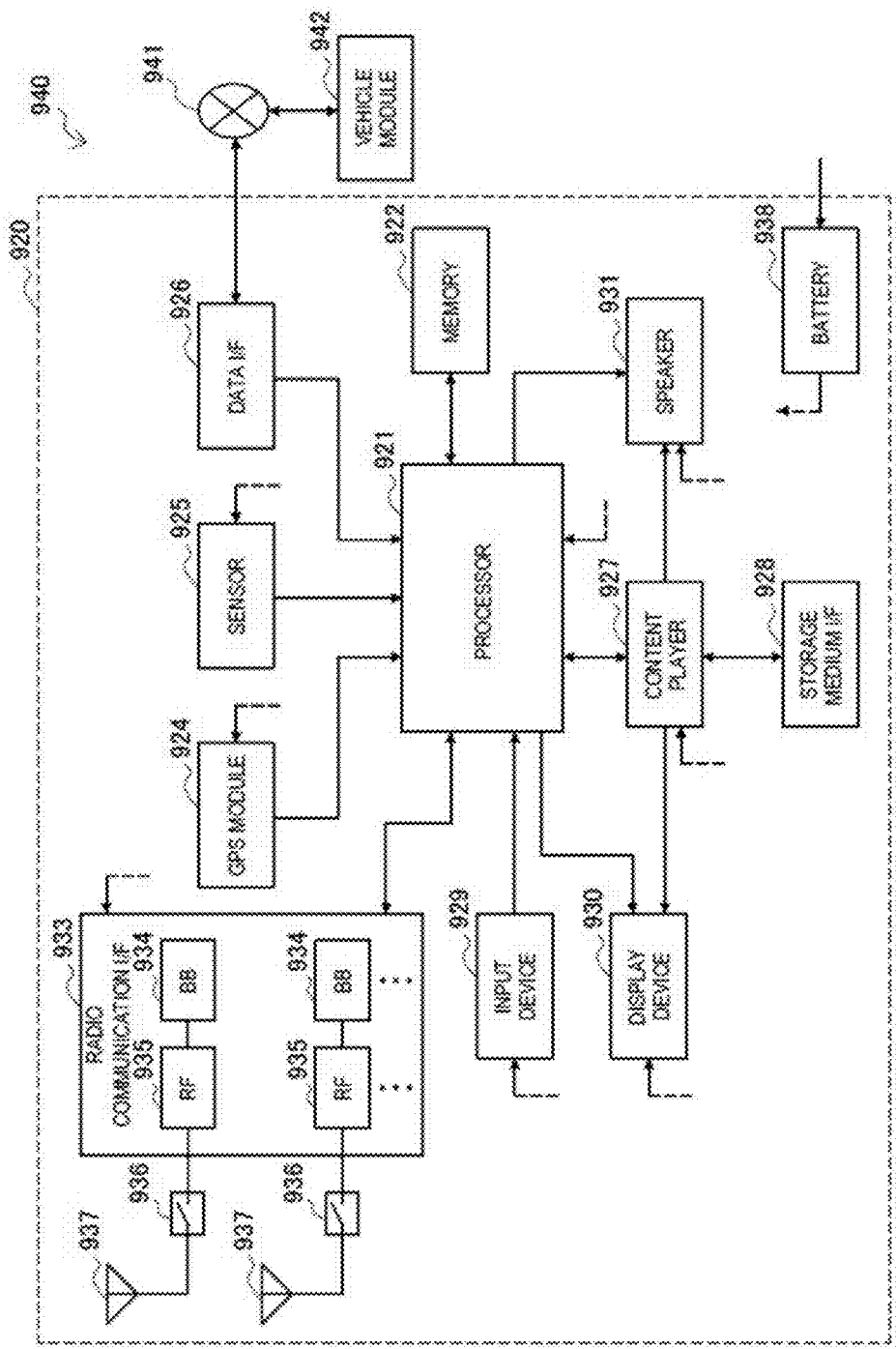
FIG. 33 is a block diagram showing an example of an exemplary configuration of a car navigation apparatus to which the technology according to the present disclosure may be applied.

FIG. 33 is a block diagram showing an example of a schematic configuration of a car navigation apparatus 920 to which the technology according to the present disclosure may be applied. The car navigation apparatus 920 includes a processor 921, a memory 922, a global positioning system (GPS) module 924, a sensor 925, a data interface 926, a content player 927, a storage medium interface 928, an input device 929, a display device 930, a speaker 931, a radio communication interface 933, one or more antenna switches 936, one or more antennas 937, and a battery 938.

The processor 921 may be, for example a CPU or a SoC, and controls a navigation function and additional function of the car navigation apparatus 920. The memory 922 includes RAM and ROM, and stores a program that is executed by the processor 921, and data.

The GPS module 924 determines a position (such as latitude, longitude and altitude) of the car navigation apparatus 920 by using GPS signals received from a GPS satellite. The sensor 925 may include a group of sensors such as a gyro sensor, a geomagnetic sensor and an air pressure sensor. The data interface 926 is connected to, for example, an in-vehicle network 941 via a terminal that is not shown, and acquires data (such as vehicle speed data) generated by the vehicle.

The content player 927 reproduces content stored in a storage medium (such as a CD and a DVD) that is inserted into the storage medium interface 928. The input device 929 includes, for example, a touch sensor configured to detect touch onto a screen of the display device 930, a button, or a switch, and receives an operation or information inputted from a user. The display device 930 includes a screen such as an LCD or OLED display, and displays an image of the navigation function or content that is reproduced. The speaker 931 outputs a sound for the navigation function or the content that is reproduced.

The radio communication interface 933 supports any cellular communication scheme (such as LTE and LTE-Advanced), and performs wireless communication. The radio communication interface 933 may typically include, for example, a BB processor 934 and an RF circuit 935. The BB processor 934 may perform, for example, encoding/decoding, modulating/demodulating and multiplexing/demultiplexing, and perform various types of signal processing for wireless communication. The RF circuit 935 may include, for example, a mixer, a filter and an amplifier, and transmits and receives wireless signals via the antenna 937. The radio communication interface 933 may also be a chip module having the BB processor 934 and the RF circuit 935 integrated thereon. The radio communication interface 933 may include multiple BB processors 934 and multiple RF circuits 935, as shown in FIG. 33. Although FIG. 33 shows the example in which the radio communication interface 933 includes the multiple BB processors 934 and the multiple RF circuits 935, the radio communication interface 933 may also include a single BB processor 934 and a single RF circuit 935.

Furthermore, in addition to a cellular communication scheme, the radio communication interface 933 may support another type of wireless communication scheme such as a short-distance wireless communication scheme, a near field communication scheme, and a wireless LAN scheme. In this case, the radio communication interface 933 may include the BB processor 934 and the RF circuit 935 for each wireless communication scheme.

Each of the antenna switches 936 switches connection destinations of the antennas 937 among multiple circuits (such as circuits for different wireless communication schemes) included in the radio communication interface 933.

Each of the antennas 937 includes a single or multiple antenna elements (such as multiple antenna elements included in an MIMO antenna), and is used by the radio communication interface 933 to transmit and receive wireless signals. As shown in FIG. 33, the car navigation apparatus 920 may include the multiple antennas 937. Although FIG. 33 shows the example in which the car navigation apparatus 920 includes the multiple antennas 937, the car navigation apparatus 920 may also include a single antenna 937.

Furthermore, the car navigation apparatus 920 may include the antenna 937 for each wireless communication scheme. In this case, the antenna switches 936 may be omitted from the configuration of the car navigation apparatus 920.

The battery 938 supplies power to the blocks of the car navigation apparatus 920 shown in FIG. 33 via feeder lines that are partially shown as dash lines in FIG. 33. The battery 938 accumulates power supplied from the vehicle.

In the car navigation apparatus 920 shown in FIG. 33, a transceiver of the electronic apparatus 400 may be implemented by the radio communication interface 933. At least a part of the functions may also be implemented by the processor 921. For example, the processor 921 may measure the interferences between two resource utilization systems adopting different RATs and report the measurement result by performing functions of the acquiring unit 401 and the performing unit 402.

The technology of the present disclosure may also be implemented as an in-vehicle system (or a vehicle) 940 including one or more blocks of the car navigation apparatus 920, the in-vehicle network 941 and a vehicle module 942. The vehicle module 942 generates vehicle data (such as a vehicle speed, an engine speed, and failure information), and outputs the generated data to the in-vehicle network 941.

The basic principle of the present disclosure has been described above in conjunction with particular embodiments. However, as can be appreciated by those ordinarily skilled in the art, all or any of the steps or components of the method and apparatus according to the disclosure can be implemented with hardware, firmware, software or a combination thereof in any computing device (including a processor, a storage medium, etc.) or a network of computing devices by those ordinarily skilled in the art in light of the disclosure of the disclosure and making use of their general circuit designing knowledge or general programming skills.

Moreover, the present disclosure further discloses a program product in which machine-readable instruction codes are stored. The aforementioned methods according to the embodiments can be implemented when the instruction codes are read and executed by a machine.

Accordingly, a memory medium for carrying the program product in which machine-readable instruction codes are stored is also covered in the present disclosure. The memory medium includes but is not limited to soft disc, optical disc, magnetic optical disc, memory card, memory stick and the like.

In the case where the present disclosure is realized with software or firmware, a program constituting the software is installed in a computer with a dedicated hardware structure (e.g. the general computer 3400 shown in FIG. 34) from a storage medium or network, wherein the computer is capable of implementing various functions when installed with various programs.

Figure 34:
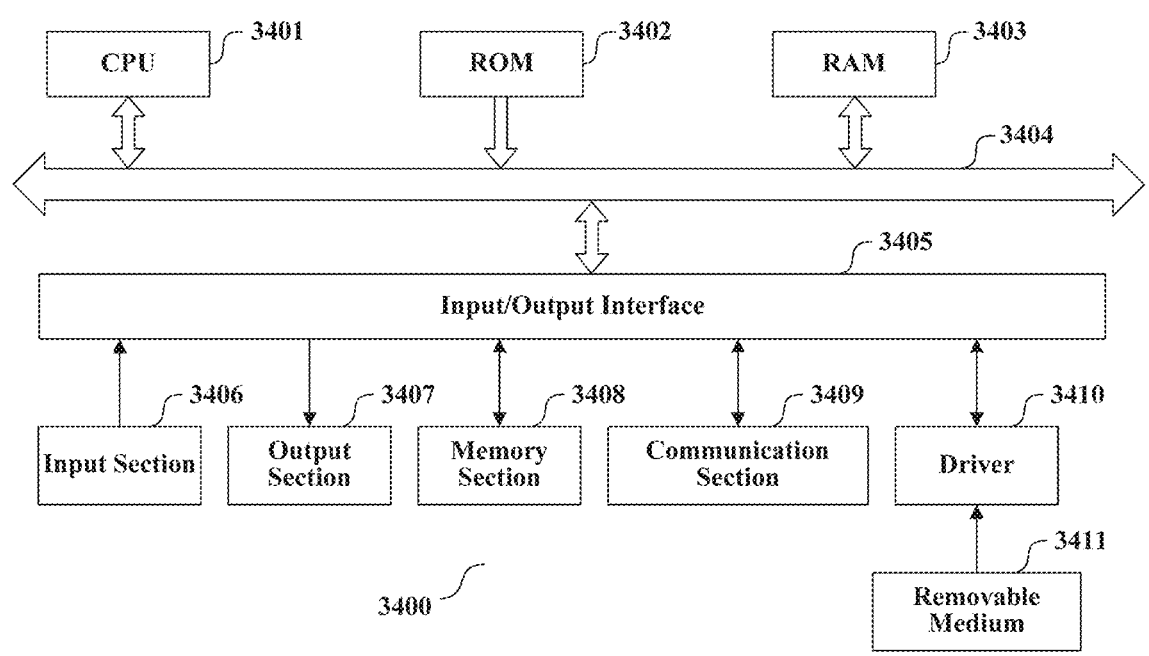
FIG. 34 is a block diagram of an exemplary block diagram illustrating the structure of a general purpose personal computer capable of realizing the method and/or device and/or system according to the embodiments of the present disclosure.

In FIG. 34, a central processing unit (CPU) 3401 executes various processing according to a program stored in a read-only memory (ROM) 3402 or a program loaded to a random access memory (RAM) 3403 from a memory section 3408. The data needed for the various processing of the CPU 3401 may be stored in the RAM 3403 as needed. The CPU 3401, the ROM 3402 and the RAM 3403 are linked with each other via a bus 3404. An input/output interface 3405 is also linked to the bus 3404.

The following components are linked to the input/output interface 3405: an input section 3406 (including keyboard, mouse and the like), an output section 3407 (including displays such as a cathode ray tube (CRT), a liquid crystal display (LCD), a loudspeaker and the like), a memory section 3408 (including hard disc and the like), and a communication section 3409 (including a network interface card such as a LAN card, modem and the like). The communication section 3409 performs communication processing via a network such as the Internet. A driver 3410 may also be linked to the input/output interface 3405, if needed. If needed, a removable medium 3411, for example, a magnetic disc, an optical disc, a magnetic optical disc, a semiconductor memory and the like, may be installed in the driver 3410, so that the computer program read therefrom is installed in the memory section 3408 as appropriate.

In the case where the foregoing series of processing is achieved through software, programs forming the software are installed from a network such as the Internet or a memory medium such as the removable medium 3411.

It should be appreciated by those skilled in the art that the memory medium is not limited to the removable medium 3411 shown in FIG. 34, which has program stored therein and is distributed separately from the apparatus so as to provide the programs to users. The removable medium 3411 may be, for example, a magnetic disc (including floppy disc (registered trademark)), a compact disc (including compact disc read-only memory (CD-ROM) and digital versatile disc (DVD), a magneto optical disc (including mini disc (MD) (registered trademark)), and a semiconductor memory. Alternatively, the memory medium may be the hard discs included in ROM 3402 and the memory section 3408 in which programs are stored, and can be distributed to users along with the device in which they are incorporated.

To be further noted, in the apparatus, method and system according to the present disclosure, the respective components or steps can be decomposed and/or recombined. These decompositions and/or recombinations shall be regarded as equivalent solutions of the disclosure. Moreover, the above series of processing steps can naturally be performed temporally in the sequence as described above but will not be limited thereto, and some of the steps can be performed in parallel or independently from each other.

Finally, to be further noted, the term "include", "comprise" or any variant thereof is intended to encompass nonexclusive inclusion so that a process, method, article or device including a series of elements includes not only those elements but also other elements which have been not listed definitely or an element(s) inherent to the process, method, article or device. Moreover, the expression "comprising a(n) . . . " in which an element is defined will not preclude presence of an additional identical element(s) in a process, method, article or device comprising the defined element(s)" unless further defined.

Although the embodiments of the present disclosure have been described above in detail in connection with the drawings, it shall be appreciated that the embodiments as described above are merely illustrative rather than limitative of the present disclosure. Those skilled in the art can make various modifications and variations to the above embodiments without departing from the spirit and scope of the present disclosure. Therefore, the scope of the present disclosure is defined merely by the appended claims and their equivalents.

The invention claimed is:

1. An electronic apparatus for wireless communications, comprising:
    processing circuitry, configured to:
        determine a first resource utilization system and a second resource utilization system within a management range of a spectrum management device, which have coverage overlap with each other and adopt the same radio access technology or adopt different radio access technologies respectively; and
        determine, based on interference conditions between the first resource utilization system and the second resource utilization system, spectrum resources allocated to the first resource utilization system and those allocated to the second resource utilization system,
    wherein the processing circuitry is further configured to determine the first resource utilization system and the second resource utilization system using an interference overlapping map,
    wherein in the interference overlapping map, an edge is connected between a first vertex representing the first resource utilization system and a second vertex representing the second resource utilization system, and
    wherein the interference overlapping map is created using information provided by the first and second resource utilization systems,
    wherein the processing circuitry is configured to determine the width of the guard band based on a measurement result of interference measuring performed by a terminal device located in an overlapping region of the first resource utilization system and the second resource utilization system,
    wherein the measurement result comprises one or more of the following: co-channel interferences, adjacent channel interferences, a co-channel interferences-to-noise ratio, an adjacent channel interferences-to-noise ratio, an out of band emission model of the first resource utilization system and/or the second resource utilization system, and
    wherein:
    the terminal device is a terminal device served by the first resource utilization system;
    the measurement result comprises a co-channel interferences-to-noise ratio and an adjacent-channel interferences-to-noise ratio of the terminal device, and an out of band emission model of the second resource utilization system; and
    the processing circuitry is configured to:
        calculate a difference between the co-channel interferences-to-noise ratio and a co-channel interferences-to-noise ratio threshold and a difference between the adjacent-channel interferences-to-noise ratio and an adjacent-channel interferences-to-noise ratio threshold, as an interference margin; and
        determine the width of the guard band based on the interference margin and the out of band emission model.

2. The electronic apparatus according to claim 1, wherein the processing circuitry is configured to determine the width of the guard band so that interferences the first resource utilization system is subjected to from the second resource utilization system is kept within a predetermined range.

3. The electronic apparatus according to claim 1, wherein the processing circuitry is further configured to set, based on the width of the guard band, a weight for the edge between the first vertex and the second vertex in the interference overlapping map.

4. The electronic apparatus according to claim 3, wherein the processing circuitry is further configured to update the interference overlapping map based on the weight, and allocate spectrum resources based on the updated interference overlapping map.

5. The electronic apparatus according to claim 4, wherein the processing circuitry is configured to first allocate spectrum resources to a resource utilization system corresponding to an edge with a high weight in the interference overlapping map.

6. The electronic apparatus according to claim 3, wherein the processing circuitry is further configured to acquire a second weight set by another spectrum management device for the edge between the first vertex and the second vertex, and set the weight for the edge based on the width of the guard band and the second weight.

7. The electronic apparatus according to claim 1, wherein the processing circuitry is further configured to instruct one of the first resource utilization system and the second resource utilization system to perform measurement configuration on one or more terminal devices located in the overlapping region.

8. The electronic apparatus according to claim 7, wherein the processing circuitry is configured to provide one or more of the following to a base station of one of the first resource utilization system and the second resource utilization system for the measurement configuration: a measurement frequency list, measurement time, measurement duration, a physical quantity to be measured, a measurement result reporting format, a reporting rule, a co-channel interferences-to-noise ratio threshold, and an adjacent channel interferences-to-noise ratio threshold.

9. A method for wireless communications performed by an electronic apparatus, the method comprising:
   determining a first resource utilization system and a second resource utilization system within a management range of a spectrum management device, which have coverage overlap with each other and adopt the same radio access technology or adopt different radio access technologies respectively; and
   determining, based on interference conditions between the first resource utilization system and the second resource utilization system, spectrum resources allocated to the first resource utilization system and those allocated to the second resource utilization system,
   wherein the method further includes determining the first resource utilization system and the second resource utilization system using an interference overlapping map,
   wherein in the interference overlapping map, an edge is connected between a first vertex representing the first resource utilization system and a second vertex representing the second resource utilization system, and
   wherein the interference overlapping map is created using information provided by the first and second resource utilization systems,
   wherein the method further includes determining the width of the guard band based on a measurement result of interference measuring performed by a terminal device located in an overlapping region of the first resource utilization system and the second resource utilization system,
   wherein the measurement result comprises one or more of the following: co-channel interferences, adjacent channel interferences, a co-channel interferences-to-noise ratio, an adjacent channel interferences-to-noise ratio, an out of band emission model of the first resource utilization system and/or the second resource utilization system, and
   wherein:
   the terminal device is a terminal device served by the first resource utilization system;
   the measurement result comprises a co-channel interferences-to-noise ratio and an adjacent-channel interferences-to-noise ratio of the terminal device, and an out of band emission model of the second resource utilization system; and
   the method further includes:
     calculating a difference between the co-channel interferences-to-noise ratio and a co-channel interferences-to-noise ratio threshold and a difference between the adjacent-channel interferences-to-noise ratio and an adjacent-channel interferences-to-noise ratio threshold, as an interference margin; and
     determining the width of the guard band based on the interference margin and the out of band emission model.

10. A non-transitory computer product containing instructions for a method for wireless communications that is performed by an electronic apparatus, the method comprising:
   determining a first resource utilization system and a second resource utilization system within a management range of a spectrum management device, which have coverage overlap with each other and adopt the same radio access technology or adopt different radio access technologies respectively; and
   determining, based on interference conditions between the first resource utilization system and the second resource utilization system, spectrum resources allocated to the first resource utilization system and those allocated to the second resource utilization system,
   wherein the method further includes determining the first resource utilization system and the second resource utilization system using an interference overlapping map,
   wherein in the interference overlapping map, an edge is connected between a first vertex representing the first resource utilization system and a second vertex representing the second resource utilization system, and
   wherein the interference overlapping map is created using information provided by the first and second resource utilization systems,
   wherein the method further includes determining the width of the guard band based on a measurement result of interference measuring performed by a terminal device located in an overlapping region of the first resource utilization system and the second resource utilization system,
   wherein the measurement result comprises one or more of the following: co-channel interferences, adjacent channel interferences, a co-channel interferences-to-noise ratio, an adjacent channel interferences-to-noise ratio, an out of band emission model of the first resource utilization system and/or the second resource utilization system, and
   wherein:
   the terminal device is a terminal device served by the first resource utilization system;
   the measurement result comprises a co-channel interferences-to-noise ratio and an adjacent-channel interferences-to-noise ratio of the terminal device, and an out of band emission model of the second resource utilization system; and
   the method further includes:
     calculating a difference between the co-channel interferences-to-noise ratio and a co-channel interferences-to-noise ratio threshold and a difference between the adjacent-channel interferences-to-noise ratio and an adjacent-channel interferences-to-noise ratio threshold, as an interference margin; and determining the width of the guard band based on the interference margin and the out of band emission model.

\* \* \* \* \*